(12) United States Patent
Levy et al.

(10) Patent No.: US 12,339,247 B2
(45) Date of Patent: Jun. 24, 2025

(54) FIELD EFFECT TRANSISTOR WITH BURIED FLUID-BASED GATE AND METHOD

(71) Applicant: GlobalFoundries U.S. Inc., Malta, NY (US)

(72) Inventors: Mark D. Levy, Williston, VT (US); Siva P. Adusumilli, South Burlington, VT (US); Aaron L. Vallett, Jericho, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 421 days.

(21) Appl. No.: 17/715,282

(22) Filed: Apr. 7, 2022

(65) Prior Publication Data

US 2023/0324332 A1    Oct. 12, 2023

(51) Int. Cl.
*G01N 27/414*    (2006.01)

(52) U.S. Cl.
CPC ..... *G01N 27/4148* (2013.01); *G01N 27/4145* (2013.01)

(58) Field of Classification Search
CPC ................ G01N 27/4148; G01N 27/4145
See application file for complete search history.

(56) References Cited

U.S. PATENT DOCUMENTS

| | | |
|---|---|---|
| 8,940,569 B2 | 1/2015 | Bedell et al. |
| 9,068,935 B2 | 6/2015 | Dorman et al. |
| 9,945,807 B2 | 4/2018 | Baghbani-Parizi et al. |
| 9,976,982 B2 | 5/2018 | Cheng et al. |
| 10,168,478 B2 | 1/2019 | Babakhani et al. |

(Continued)

FOREIGN PATENT DOCUMENTS

| | | |
|---|---|---|
| CN | 111971552 A | 11/2020 |
| DE | 102017103469 A1 | 7/2018 |
| JP | 2012-168193 A | 6/2012 |

OTHER PUBLICATIONS

U.S. Appl. No. 17/689,120, Response to Office Action filed Apr. 25, 2023, 16 pages.

(Continued)

*Primary Examiner* — Nduka E Ojeh
*Assistant Examiner* — Ethan Edward Cutler
(74) *Attorney, Agent, or Firm* — Francois Pagette; Hoffman Warnick LLC

(57) ABSTRACT

Disclosed is a semiconductor structure including a device (e.g., a field effect transistor (FET), a biosensor FET (bioFET) or an ion-sensitive FET (ISFET)) with a fluid-based gate. The structure includes a substrate, an intermediate layer on the substrate, and a semiconductor layer on the intermediate layer. The device includes, within the semiconductor layer, a source region, a drain region, and a channel region between the source and drain regions. The structure includes, for the fluid-base gate, a cavity within the intermediate layer below the channel region and lined with a dielectric liner. Optionally, the exposed surface of the dielectric liner within the cavity is functionalized. Additional dielectric layers are stacked on the semiconductor layer and at least one port extends essentially vertically through the dielectric layers, the semiconductor layer and the dielectric liner to the cavity so as to allow fluid for the fluid-based gate to flow into the cavity.

20 Claims, 15 Drawing Sheets

(56) References Cited

U.S. PATENT DOCUMENTS

| | | | |
|---|---|---|---|
| 11,016,055 | B2 | 5/2021 | Campanella-Pineda et al. |
| 11,119,101 | B2 | 9/2021 | Huang et al. |
| 11,940,407 | B2 | 3/2024 | Ghyselen |
| 2002/0177175 | A1 | 11/2002 | Hefti et al. |
| 2005/0035278 | A1 | 2/2005 | Margalit |
| 2012/0092650 | A1 | 4/2012 | Gunn, III |
| 2014/0003761 | A1 | 1/2014 | Dong |
| 2014/0106494 | A1 | 4/2014 | Bedell et al. |
| 2014/0225166 | A1* | 8/2014 | Ellis-Monaghan ............ H10D 30/021 257/253 |
| 2014/0268165 | A1 | 9/2014 | Suh |
| 2016/0091446 | A1 | 3/2016 | Mayer et al. |
| 2016/0116402 | A1 | 4/2016 | Chen et al. |
| 2017/0284963 | A1* | 10/2017 | Cao ................. G01N 27/44791 |
| 2018/0083098 | A1 | 3/2018 | Goktepeli |
| 2020/0144369 | A1 | 5/2020 | Lin et al. |
| 2020/0150066 | A1 | 5/2020 | Udrea et al. |
| 2021/0010971 | A1* | 1/2021 | Campanella-Pineda .................... H10D 86/201 |
| 2021/0325338 | A1* | 10/2021 | Hsiao ................. H10D 30/6729 |

OTHER PUBLICATIONS

Jeon et al., "Buried Air Gap Structure for Improving the Breakdown Voltage of SOI Power MOSFETs," IEEE, Proceedings IPEMC 2000. Third International Power Electronics and Motion Control Conference (IEEE Cat. No. 00EX435), 2000, pp. 1061-1063.

Duan et al., "Functionalized Polyelectrolytes Assembling on Nano-BioFETs for Biosensing Applications," Advanced Functional Materials, vol. 25, 2015, pp. 2279-2286.

Huang et al., "Electrochemical Processes and Mechanistic Aspects of Field-Effect Sensors for Biomolecules," J Mater Chem C Mater Opt Electron Devices, vol. 3(25), 2015, pp. 1-58.

Lee et al., "Device Considerations for Development of Conductance-Based Biosensors," Journal of Applied Physics, vol. 105, 102046, 2009, pp. 1-13.

Reiner-Rozman et al., "Graphene-Based Liquid-Gated Field Effect Transistor for Biosensing: Theory and Experiments," Biosens Bioelectron, 70: 21-27, 2015, pp. 1-16.

Sung et al., "A Review of BioFET's Basic Principles and Materials for Biomedical Applications," Korean Society of Medical and Biological Engineering, 2021, pp. 1-12.

Windbacher et al., "Simulation of Field-Effect Biosensors (BioFETs) for Biotin-Streptavidin Complexes," American Institute of Physics, 2009, pp. 1-3.

Belaroussi et al., "RF and Non-Linearity Characterization of Porous Silicon Layer for RF-ICs," IEEE, 2014, pp. 1-5.

Chen et al., "40 GHz RF Biosensor Based on Microwave Coplanar Waveguide Transmission Line for Cancer Cells (HepG2) Dielectric Characterization," Biosensors and Bioelectronics, vol. 61, 2014, pp. 417-421.

Van Dorst et al., "Integration of an Optical CMOS Sensor with a Microfluidic Channel Allows a Sensitive Readout for Biological Assays in Point-of-Care Tests," Biosensors and Bioelectronics, vol. 78, 2016, pp. 126-131.

Esfeh et al., Low-Cost Wideband Double-Layer Microstrip Coupled-Line Directional Coupler with High Directivity, Microwave and Optical Technology Letters, vol. 56, No. 7, 2014, pp. 1570-1575.

Esfeh et al., "RF Non-Linearities from Si-Based Substrates," IEEE, 2014, pp. 1-3.

Huang et al., "Lab-on-CMOS Integration of Microfluidics and Electrochemical Sensors," Lab Chip, 13(19), 2013, pp. 1-14.

Bogaerts et al., "Silicon Microring Resonators," Laser & Photonics Reviews, 6, No. 1, 2012, pp. 47-73.

Dumon et al., "WDM filters in Silicon-on-Insulator Photonic Wires," Research Gate, 2004, pp. 1-2.

Henriksson et al., "An Approach to Ring Resonator Biosensing Assisted by Dielectrophoresis: Design, Simulation and Fabrication," Micromachines, 11, 954, 2020, pp. 1-16.

Steglich et al., "Optical Biosensors Based on Silicon-On-Insulator Ring Resonators: A Review," Molecules, 24, 519, 2019, pp. 1-16.

Flueckiger et al., "Sub-Wavelength Grating for Enhanced Ring Resonator Biosensor," Optics Express, vol. 24, No. 14, 2016, pp. 1-15.

Lo et al., Photonic Crystal Microring Resonator for Label-Free Biosensing, Optics Express, vol. 25, No. 6, 2017, pp. 1-9.

Reinecke et al., "Biosensor Based on a Split-Ring Resonator," AMA Conferences—Sensor and IRS, 2017, pp. 78-83.

Sarkaleh et al., "Optical Ring Resonators: A Platform for Biological Sensing Applications," Journal of Medical Signals & Sensors, Published by Wolters Kluwer—Medknow, 2017, pp. 185-191.

Wang et al., "Silicon Coupled-Resonator Optical-Waveguide-Based Biosensors Using Light-Scattering Pattern Recognition with Pixelized Mode-Field-Intensity Distributions," Scientific Reports, vol. 4, 2014, pp. 1-9.

U.S. Appl. No. 17/493,969, Amendment to Office Action filed Dec. 9, 2024, 11 pages.

U.S. Appl. No. 17/689,120 Office Acton dated Feb. 10, 2023, 16 pages.

U.S. Appl. No. 17/493,969 Office Action dated Oct. 9, 2024, 12 pages.

Xu et al, "Label-free biosensor array based on silicon-on-insulator ring resonators addressed using a WDM approach." Optics letters 35.16 (2010): 2771-2773.

Taniguchi et al, "Differential Si ring-resonator biosensors robust to process variations." 11th International Conference on Grou IV Photonics (GFP), IEEE, 2014.

Carlborg et al, "A packaged optical slot-waveguide ring resonator sensor array for multiplex label-free assays in labs-on-chips." Lab on a Chip 10.3 (2010), pp. 281-290.

Iqbal et al, "Label-free biosensor arrays based on silicon ring resonators and high-speed optical scanning instrumentation," IEEE Journal of selected topics in quantum electronics, 16.3 (2010) pp. 654-661.

U.S. Appl. No. 17/493,969 Final Office Action dated Mar. 13, 2025, 13 pages.

U.S. Appl. No. 17/493,969, Response to Final Office Action filed Apr. 9, 2025, 13 pages.

* cited by examiner

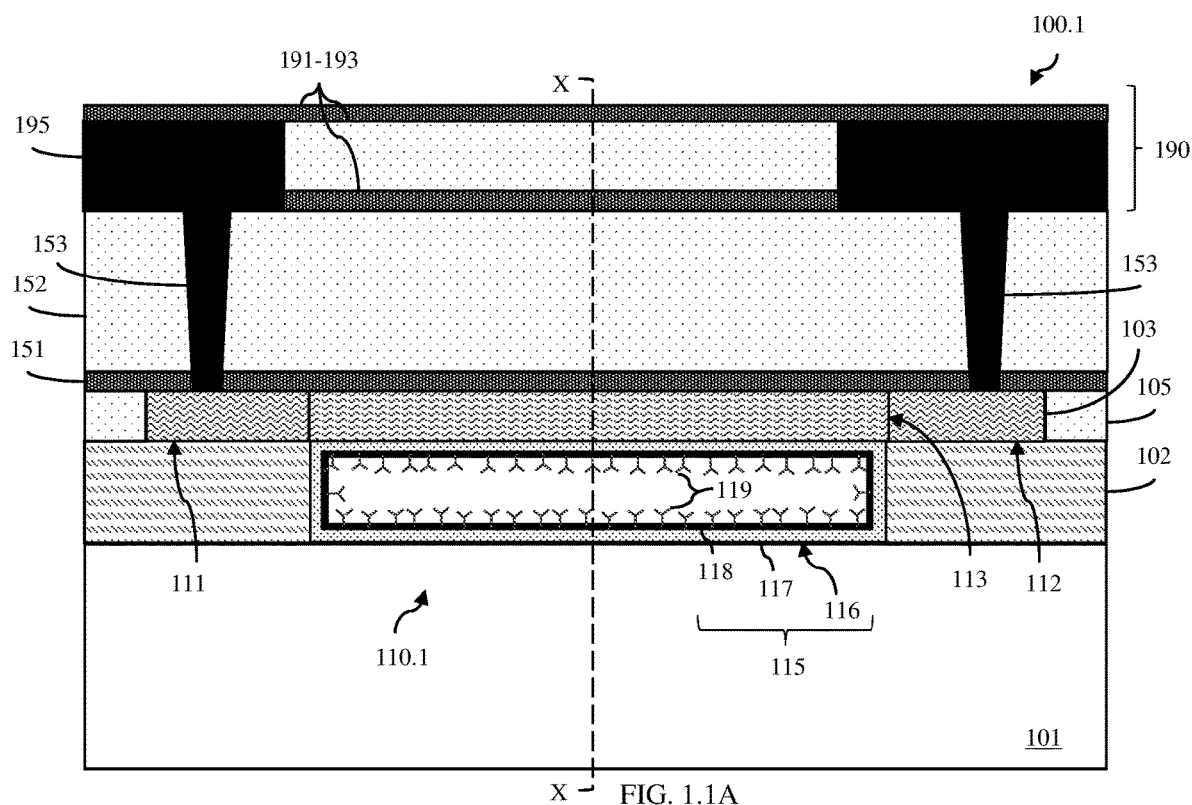
FIG. 1.1A
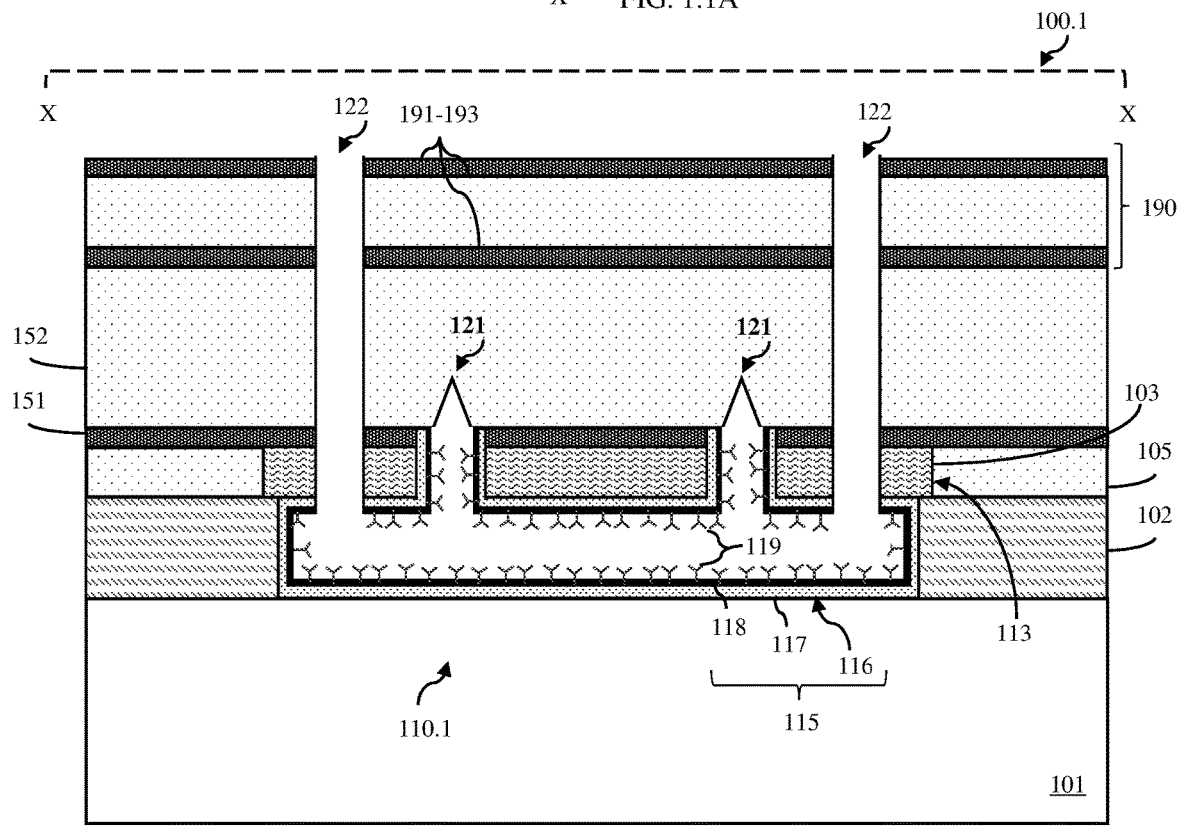
FIG. 1.1B

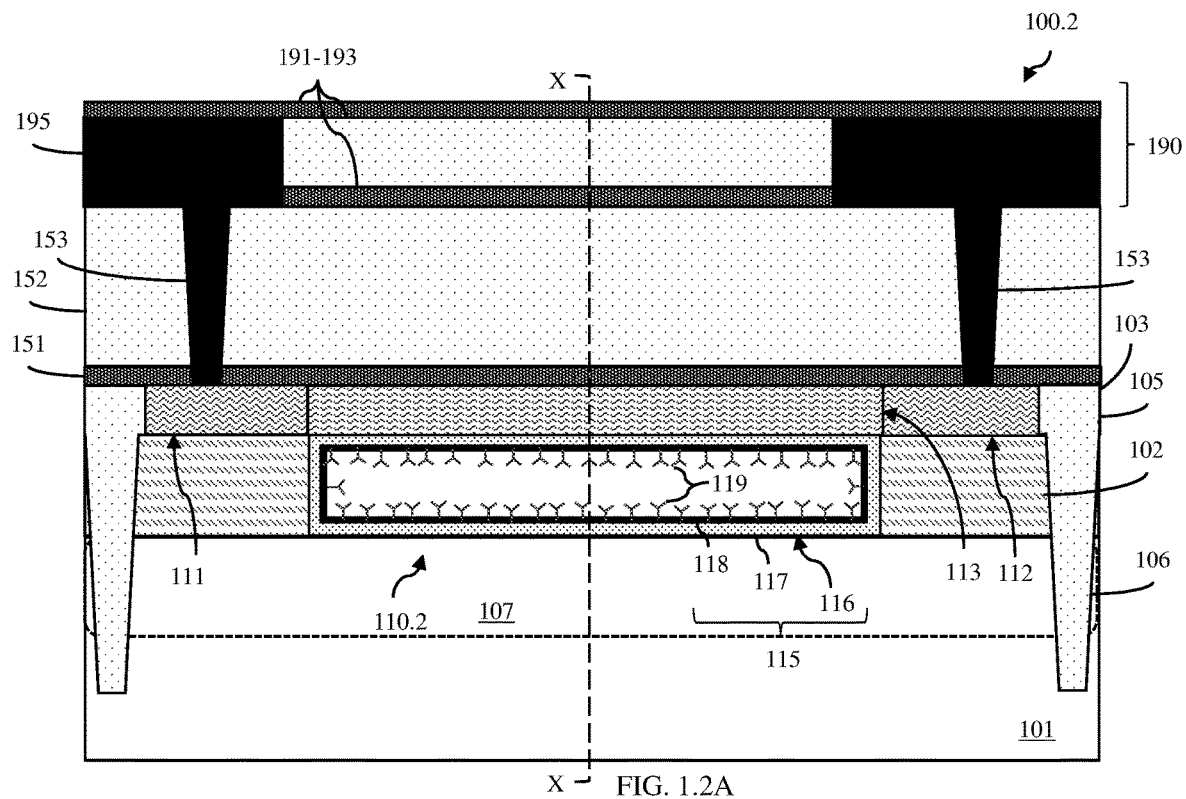
FIG. 1.2A
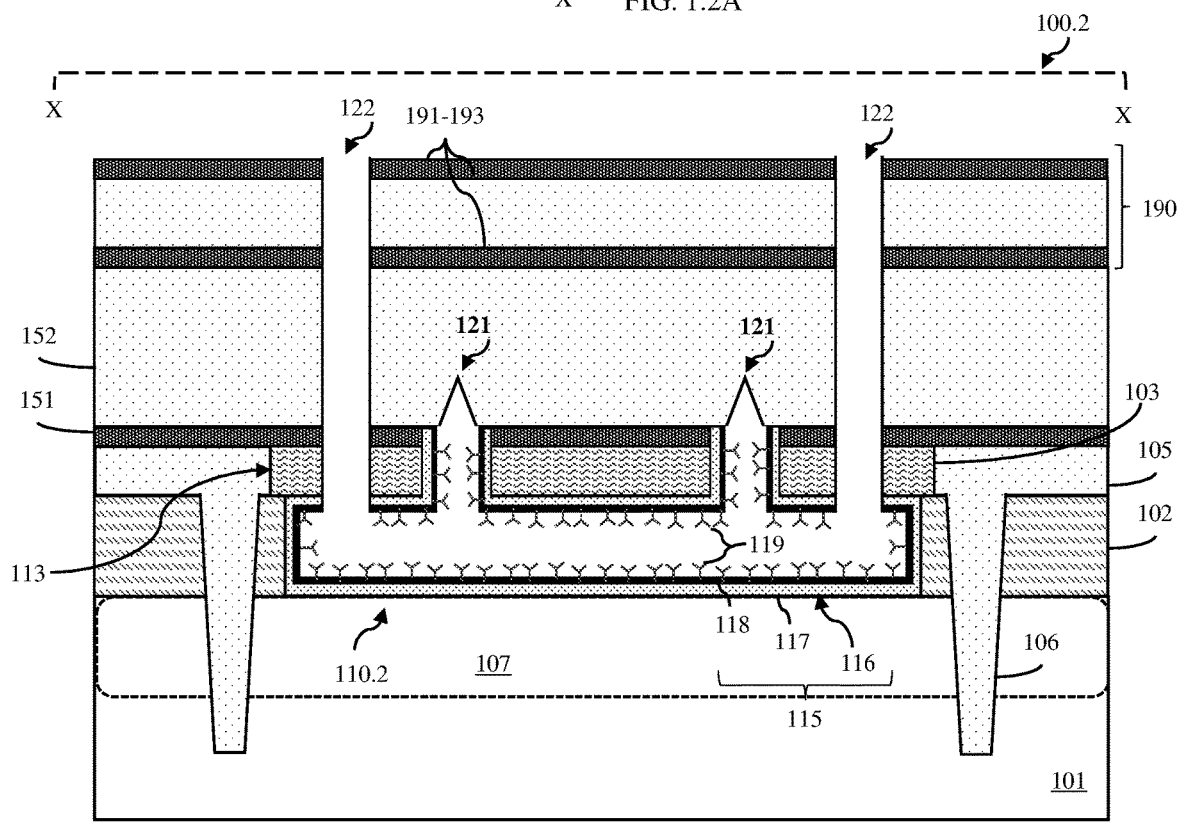
FIG. 1.2B

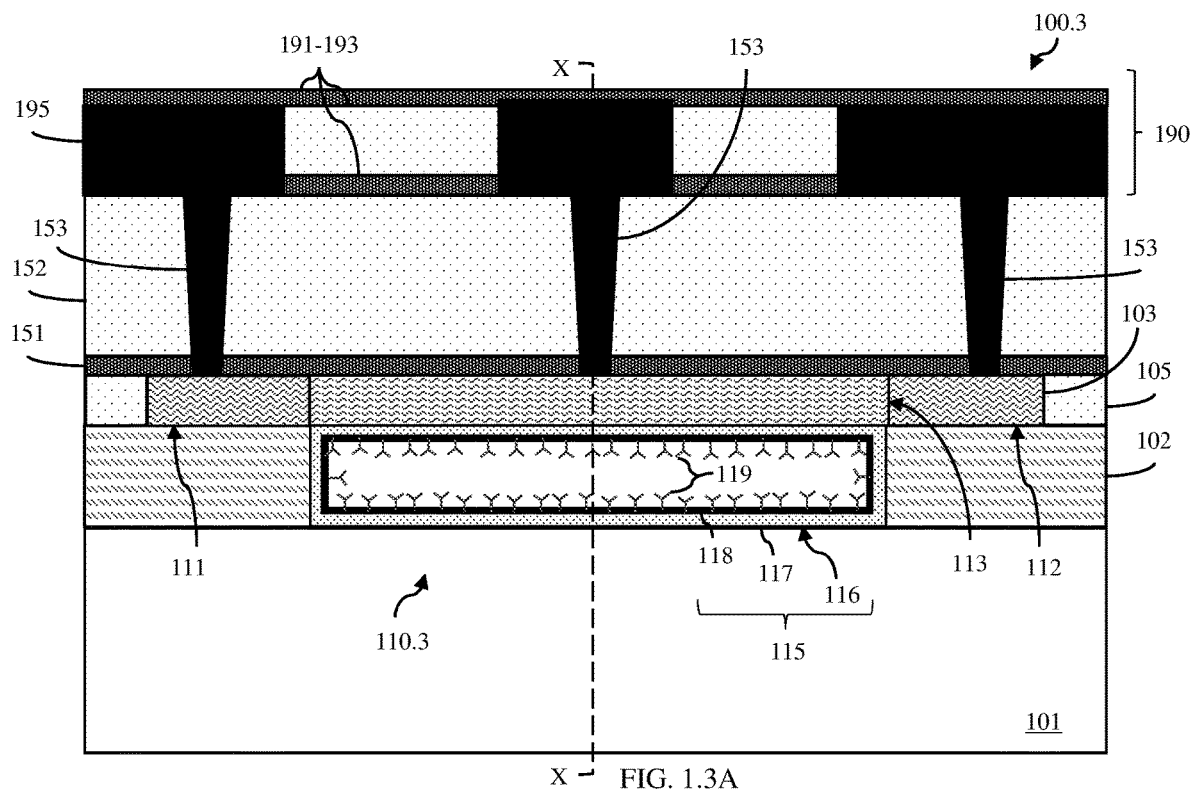
FIG. 1.3A
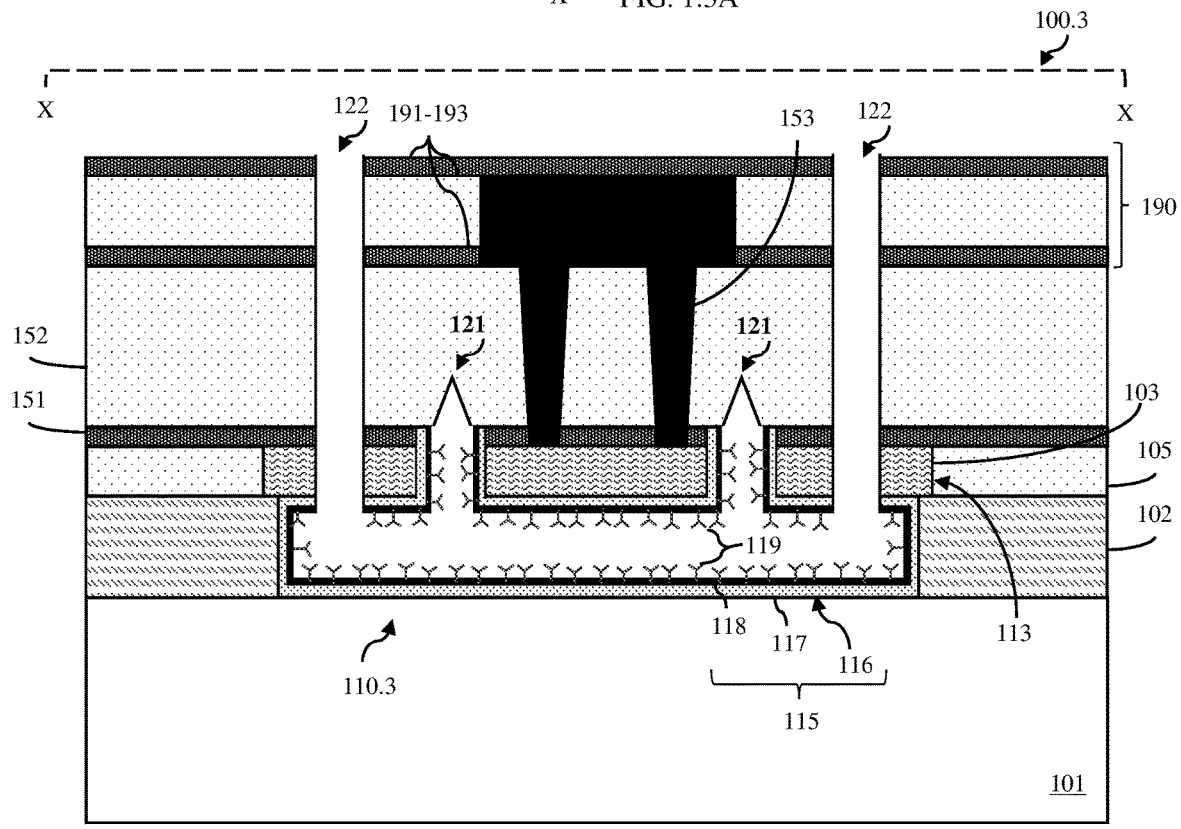
FIG. 1.3B

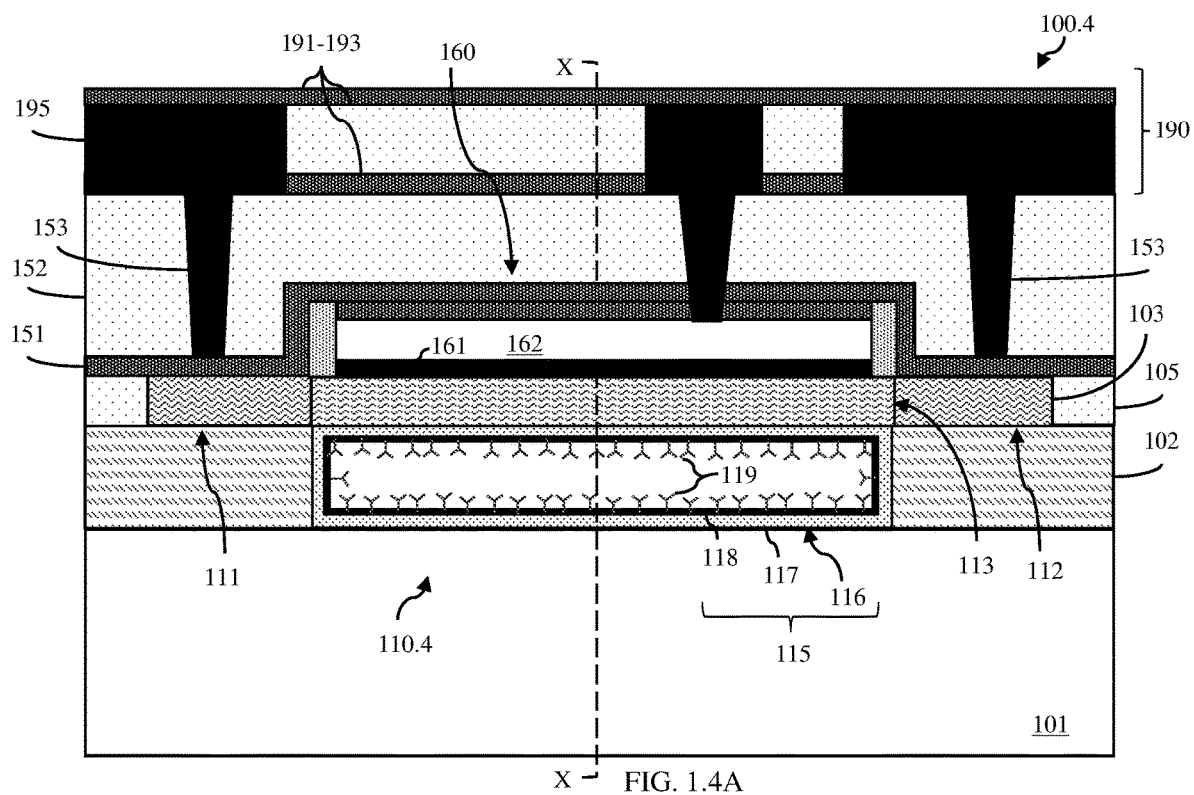
FIG. 1.4A
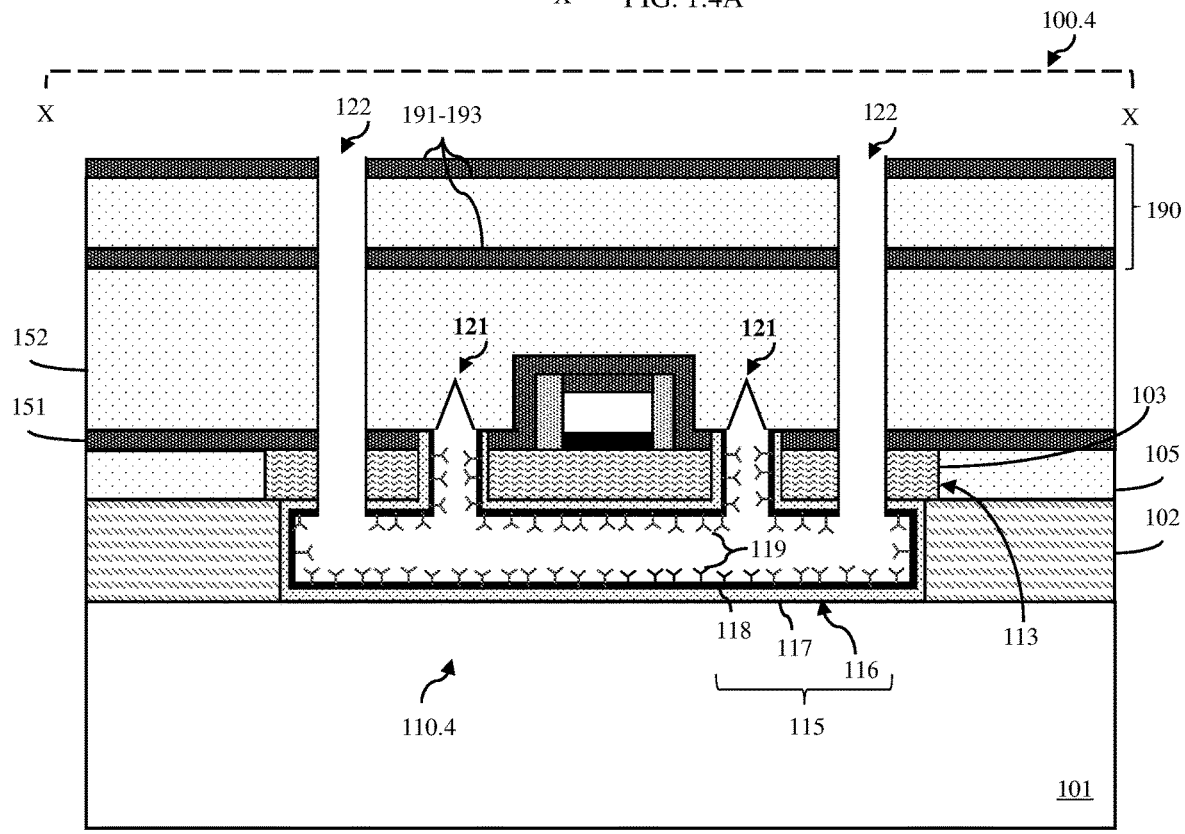
FIG. 1.4B

FIELD EFFECT TRANSISTOR WITH BURIED FLUID-BASED GATE AND METHOD

BACKGROUND

Field of the Invention

The present invention relates to field effect transistors (FETs) and, more particularly, to embodiments of a semiconductor structure including a FET with a fluid-based gate and a method of forming the structure.

Description of Related Art

FETs can be configured for fluid sensing. In such FETs, the threshold voltage (VT) depends on the surface potential at an interface between a gate dielectric layer and a fluid. This surface potential will vary depending upon the composition of the fluid. Variations in the VT caused by variations in the surface potential can, in turn, result in variations in drain current (Id). Thus, Id can be measured during a sensing operation and used, for example, to sense ions in or the pH of a fluid or to characterize and/or identify a target analyte in the fluid.

SUMMARY

Disclosed herein are embodiments of a structure. The structure can include a substrate and an intermediate layer on the substrate. The structure can further include a semiconductor layer on the intermediate layer. The structure can further include a cavity in the intermediate layer and a dielectric liner that lines the cavity such that, within the cavity, it is immediately adjacent to the semiconductor layer. The structure can further include at least one port, which extends through the semiconductor layer and the dielectric liner to the cavity.

Some of the embodiments of the structure disclosed herein can include a device (e.g., a FET or, more particularly, a biosensor FET (bioFET)). Specifically, the structure can include a substrate and an intermediate layer on the substrate. The structure can further include a semiconductor layer on the intermediate layer. The structure can further include a device. The device can include a source region, a drain region and a channel region. The channel region can be within the semiconductor layer positioned laterally between the source region and the drain region. The device can also include a cavity in the intermediate layer aligned below the channel region and a dielectric liner lining the cavity such that, within the cavity, it is immediately adjacent to the semiconductor layer at the channel region. Additionally, within the cavity, an exposed surface of the dielectric liner can include bioreceptors. The device can further include at least one port, which extends through the semiconductor layer and the dielectric liner to the cavity.

Also disclosed herein are method embodiments for forming the above-described structures. For example, an embodiment of a method can include forming a cavity in an intermediate layer, which is stacked between a substrate and a semiconductor layer. The method can further include lining the cavity with a dielectric liner such that, within the cavity, the dielectric liner is immediately adjacent to the semiconductor layer. The method can further include forming at least one port, which extends through the semiconductor layer and the dielectric liner to the cavity.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 1.1A and 1.1B are different cross-section diagrams illustrating an embodiment of a semiconductor structure including a FET with a fluid-based gate;

FIGS. 1.2A and 1.2B are different cross-section diagrams illustrating another embodiment of a semiconductor structure including a FET with a fluid-based gate;

FIGS. 1.3A and 1.3B are different cross-section diagrams illustrating yet another embodiment of a semiconductor structure including a FET with a fluid-based gate;

FIGS. 1.4A and 1.4B are different cross-section diagrams illustrating yet another embodiment of a semiconductor structure including a FET with a fluid-based gate;

DETAILED DESCRIPTION

Figure 2A:
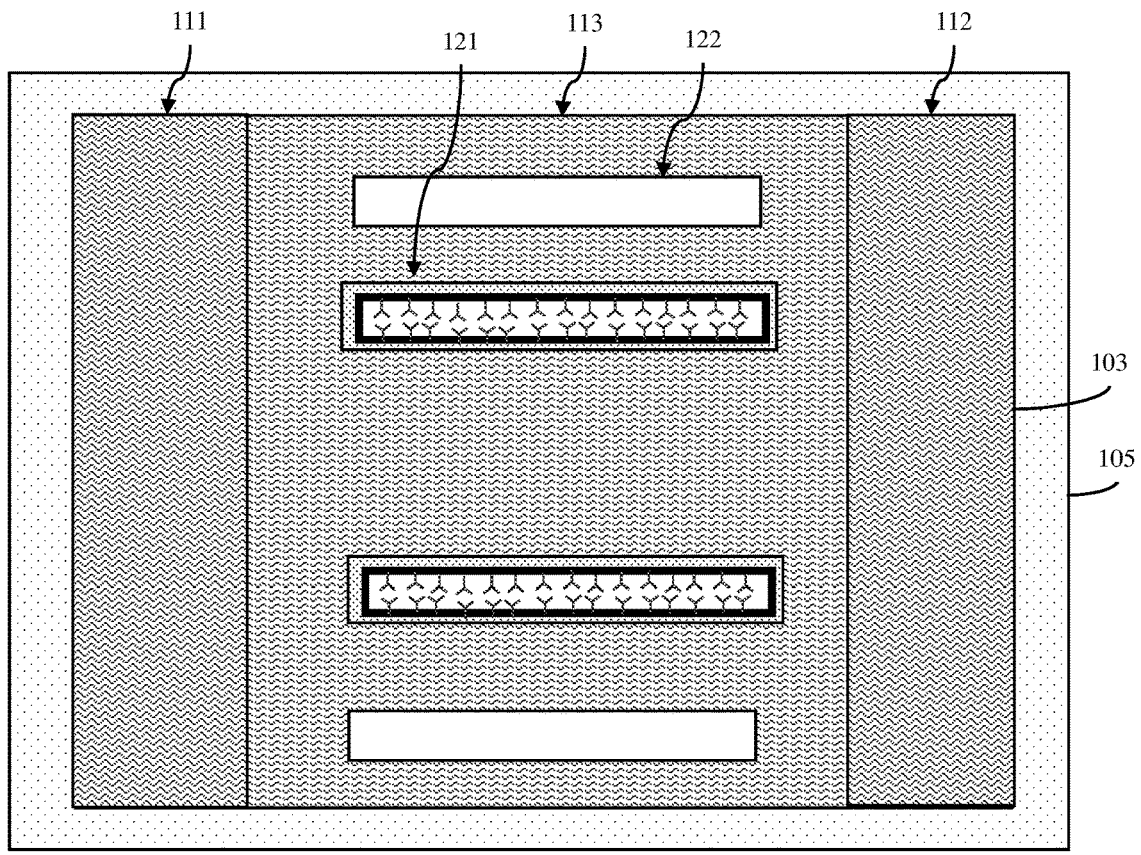
FIGS. 2A-2D are exemplary horizontal cross-section diagrams illustrating any of the disclosed semiconductor structures at an interface between an intermediate layer and a semiconductor layer above.

FETs, such as bioFETs, ion-sensitive FETs (ISFETs), or the like, can be configured for fluid sensing. For example, they can be configured to sense the ions in or the pH of a fluid or to characterize and/or identify a target analyte in a fluid. Typically, such FETs include a semiconductor layer with a channel region positioned laterally between source/drain regions. However, instead of a conventional gate structure being adjacent to the channel region, a fluid-based gate structure can be adjacent to the channel region. Specifically, a thin gate dielectric layer can be on the channel region, a middle of the line (MOL) interlayer dielectric (ILD) material layer can be on the gate dielectric layer, and a reservoir can extend vertically through the ILD material layer such that the gate dielectric layer is exposed at the bottom of the reservoir. Optionally, the gate dielectric layer can have a functionalized surface (e.g., a surface that has been processed to include molecular receptors specific to a target analyte). During a sensing operation, specific bias conditions can be applied to the device terminals and the functionalized surface of the gate dielectric layer can be exposed to a fluid flowing through the reservoir. The VT of the FET will depend on the surface potential at the interface between the gate dielectric layer and the fluid. This surface potential will vary depending upon the composition of the fluid. For example, the surface potential can vary depending upon specific ions in the fluid and/or the pH of the fluid or, if the gate dielectric layer has a functionalized surface, the surface potential can vary when target analytes, if any, within the fluid bind to receptors. Variations in the VT caused by variations in the surface potential can, in turn, result in variations in Id. Thus, Id can be measured during the sensing operation and used, for example, to sense the ions in or the pH of the fluid or to characterize and/or identify the target analyte in the fluid. Unfortunately, during formation of such FETs, it can be difficult to etch out the reservoir that will contain the fluid, while also preserving the thin gate dielectric layer.

In view of the foregoing, disclosed herein are embodiments of a semiconductor structure, which can include a device (e.g., a FET, such as a bioFET, an ISFET or the like) with a buried fluid-based gate. Specifically, the semiconductor structure can include a semiconductor substrate, an intermediate layer on the semiconductor substrate, and a semiconductor layer with a first surface immediately adjacent to the intermediate layer and a second surface opposite the first surface. The device can be, for example, a FET, such as a bioFET, an ISFET or the like and can include, within the semiconductor layer, a source region, a drain region, and a channel region positioned laterally between the source region and the drain region. The device can also include a fluid-based gate. However, instead of the fluid-based gate being contained in an open reservoir above the channel region. In the disclosed embodiments, the fluid-base gate can be buried and, particularly, contained in a cavity within the intermediate layer aligned below the channel region. The cavity can include a dielectric liner of a suitable gate dielectric material lining the cavity and, particularly, immediately adjacent to the first surface of the semiconductor layer at the channel region. The exposed surface of the dielectric liner within the cavity can be functionalized. One or more additional dielectric layers can be stacked on the second surface of the semiconductor layer and at least one port can extend essentially vertically through the dielectric layers, the semiconductor layer and the dielectric liner to the cavity so as to allow fluid for the fluid-based gate to flow into the cavity.

More particularly, referring to FIGS. 1.1A-1.1B, 1.2A-1.2B, 1.3A-1.3B and 1.4A-1.4B, disclosed embodiments of a semiconductor structure 100.1, 100.2, 100.3, and 100.4 including a device 110.1, 110.2, 110.3, and 110.4, respectively, with a buried fluid-based gate 115. As discussed in greater detail below, this device 110.1, 110.2, 100.3, 110.4 can be, for example, a FET and, particularly, a bioFET, an ISFET, or the like.

In any case, the semiconductor structure 100.1-100.4 can include a substrate 101, an intermediate layer 102 on the substrate 101, and a semiconductor layer 103 on the intermediate layer 102.

In some embodiments, the semiconductor structure 100.1-100.4 can be a semiconductor-on-insulator structure (e.g., a silicon-on-insulator (SOI) structure) with the intermediate layer 102 being the insulator layer. For example, the semiconductor structure 100.1-100.4 can include a monocrystalline semiconductor substrate 101 (e.g., a silicon substrate) or a substrate of some other suitable semiconductor substrate material. The semiconductor structure 100.1-100.4 can further include an insulator layer on the substrate 101. The insulator layer can be made of silicon dioxide or some other suitable insulator material. The semiconductor layer 103 can be made of silicon or some other suitable monocrystalline semiconductor material and can have a first surface (a bottom surface) immediately adjacent to the insulator layer (which, as mentioned above, in this case is the intermediate layer 102) and a second surface (a top surface) opposite the first surface.

In other embodiments, the semiconductor structure 100.1-100.4 can be a bulk semiconductor structure and the intermediate layer 102 can be an additional semiconductor layer. For example, the semiconductor structure 100.1-100.4 can include a monocrystalline semiconductor substrate 101 (e.g., a silicon substrate) or a substrate of some other suitable monocrystalline semiconductor substrate material. The semiconductor structure 100.1-100.4 can further include a pair of monocrystalline epitaxial semiconductor layers including a first epitaxial semiconductor layer (in this case the intermediate layer 102) immediately adjacent to the substrate and a second epitaxial semiconductor layer (in this case the semiconductor layer 103) having a first surface (bottom surface) immediately adjacent to the first epitaxial semiconductor layer and a second surface (top surface) opposite the bottom surface. The first epitaxial semiconductor layer can specifically be made of a monocrystalline semiconductor material that is different from the monocrystalline semiconductor materials of the semiconductor substrate and the second epitaxial semiconductor layer. For example, if the semiconductor substrate 101 and the second epitaxial semiconductor layer (in this case the semiconductor 103) are made of silicon, then the first epitaxial semiconductor layer (in this case the intermediate layer 102) can be made of a silicon germanium or some other suitable monocrystalline semiconductor material that is different from silicon.

It should be noted that the semiconductor layer 103 can have a first surface (also referred to herein as a bottom surface) immediately adjacent to the intermediate layer 102 and a second surface (also referred to herein as a top surface) opposite the first surface.

Isolation regions 105 (e.g., shallow trench isolation (STI) regions) can extend essentially vertically through the semiconductor layer 103 to the intermediate layer 102 below. The isolation regions 105 can further laterally surround and, thereby, define an active device region for the FET 110.1-110.4.

The FET 110.1-110.4 can include, within the active device region of the semiconductor layer 103, a channel region 113 positioned laterally between a source region 111 and a drain region 112. In the below description of the FET, reference is made to regions of the semiconductor layer being doped so as to have a first-type conductivity or a second-type conductivity that is different from the first-type conductivity. It should be understood that the first-type conductivity and the second-type conductivity are either P-type conductivity and N-type conductivity, respectively, or N-type conductivity and P-type conductivity, respectively, depending upon whether the FET is an N-type FET (NFET) or a P-type FET (PFET).

Specifically, if the FET 110.1-110.4 is an NFET, then the first-type conductivity refers to P-type conductivity and the second-type conductivity refers to N-type conductivity. However, if the FET is a PFET, then the first-type conductivity refers to N-type conductivity and the second-type conductivity refers to P-type conductivity. See the detailed discussion below regarding different dopants that can be employed in semiconductor materials to achieve P-type conductivity or N-type conductivity. Thus, in the FET 110.1-110.4, the channel region 113 can have the first-type conductivity at a relative low conductivity (or alternatively can be undoped) and the source region 111 and the drain region 112 can have the second-type conductivity at a relatively high conductivity level. For example, for an NFET, the channel region 113 can be a P− channel region and the source region 111 and the drain region 112 can be N+ source/drain regions; whereas, for a PFET, the channel region 113 can be an N− channel region and the source region 111 and the drain region 112 can be P+ source/drain regions.

The FET 110.1-110.4 can further include a buried fluid-based gate 115 adjacent to the first surface (i.e., the bottom surface) of the semiconductor layer 103 at the channel region 113 such that the active surface of the device is below, not above, the semiconductor layer 103. Specifically, the semiconductor structure 100.1-100.4 can further include one or more openings 121, which extend essential vertically through a relatively thin conformal additional dielectric layer, such as an etch stop layer 151, on the second surface of the semiconductor layer 103 and further through the channel region 113 within the semiconductor layer 103. As discussed in greater detail below with regard to the method embodiments, these opening(s) 121 are employed for etching out a cavity 116 in the intermediate layer 102 below the channel region 113. That is, the semiconductor structure 100.1-100.4 can further include, for the fluid-base gate 115 of the FET 110.1-110.4, a cavity 116 within the intermediate layer 102 below the channel regions 113 and opening(s) 121 therein. This cavity 116 can be etched during processing such that it extends laterally in a first direction across the width of the channel region 113 (e.g., to just below the interfaces between the channel region 113 and the STI regions 105), such that it further extends laterally in a second direction perpendicular to the first direction across the length of the channel region 113 (e.g., to just below the interfaces between the channel region 113 and the source/drain regions 111-112), and such that it extends vertically from immediately adjacent to the first surface of the semiconductor layer 103 downward toward, to (as illustrated), or into the top surface of the semiconductor substrate 101. For the fluid-based gate 115, this cavity 116 and the sidewalls of the opening(s) 121 can be lined with a thin dielectric liner 117 of a suitable gate dielectric material. This gate dielectric material can be, for example, silicon dioxide, a high-K dielectric material, or any other suitable dielectric material. Exemplary high-K dielectric materials include, but are not limited to, hafnium (HO-based dielectric materials (e.g., hafnium oxide, hafnium silicon oxide, hafnium silicon oxynitride, hafnium aluminum oxide, etc.), aluminum oxide, tantalum oxide, zirconium oxide, etc. As discussed further in the discussion of the method embodiments, the gate dielectric material can be any suitable gate dielectric material that can be deposited using a technique, such as atomic layer deposition (ALD), to line the cavity 116 through the opening(s) 121.

It should be noted that if the FET 110.1-110.4 is to be employed for sensing ions in and/or pH of a fluid (e.g., in the case of an ISFET) no dielectric liner surface functionalization will be necessary. That is, the surface 118 of the dielectric liner 117 exposed within the cavity 116 will be unadulterated. However, optionally and as illustrated in the drawings for purposes of illustration, an exposed surface 118 of the dielectric liner 117 within the cavity 116 can be functionalized. That is, within the cavity, the exposed surface 118 of the dielectric liner 117 can, due to specific processing performed during manufacturing, contain specific molecular receptors 119 for a target analyte. For example, in the case of a bioFET, the exposed surface 118 of the dielectric liner 117 within the cavity can include specific bioreceptors 119 for a target bioanalyte.

The semiconductor structure 100.1-100.4 can further include a relatively thin conformal additional dielectric layer such as the etch stop layer 151 (as mentioned above) on the semiconductor layer 103 and further extending laterally over the STI regions 105. This etch stop layer 151 can be, for example, a relatively thin silicon nitride layer or a relative thin layer of some other dielectric material suitable for use as an etch stop layer. The semiconductor structure 100.1-100.4 can further include at least one MOL ILD material layer 152 on the etch stop layer. The ILD material layer 152 can be, for example, silicon dioxide, doped silicon glass (e.g., phosphosilicate glass (PSG) or borophosphosilicate glass (BPSG)), or any other suitable ILD material. This ILD material layer 152 can cap the opening(s) 121. It should be noted that, depending upon the method used to deposit the ILD material layer 152 during processing, the bottom surface(s) of the portion(s) of the ILD material layer 152 that cap the opening(s) 121 may have concave surface(s) (e.g., with V or deep-V shape(s) extending into the ILD material layer 152). Furthermore, although not shown, some of the ILD material may be deposited into the opening(s) 121 onto the surface of the dielectric liner 117 at the bottom of the cavity 116.

The semiconductor structure 100.1-100.4 can further include one or more back end of the line (BEOL) metal levels 190 on the top surface of the ILD material layer 152. For example, a BEOL metal level can include a relatively thin dielectric layer such as an additional etch stop layer 191 (e.g., a thin silicon nitride layer) above and immediately adjacent to the top surface of the ILD material layer 152, an additional ILD material layer 192 on the additional etch stop layer 191, and yet another additional etch stop layer 193 on the additional ILD material layer 192. The semiconductor structure 100.1-100.4 can further include one or more metal wires 195 in the BEOL metal level(s) (e.g., within the layers 191-192). The semiconductor structure 100.1-100.4 can further include one or more MOL contacts 153. These MOL contacts 153 can, for example, extend essentially vertically between one or more of the terminals (e.g., at least the source region 111 and the drain region 112) of the FET 110.1-110.4 and the metal wires 195 (e.g., through the layers 151-152).

The semiconductor structure 100.1-100.4 can further include, for the fluid-base gate 115 of the FET 110.1-110.4, one or more ports 122, which extend vertically through the BEOL dielectric layers (e.g., 191-193), through the MOL dielectric layers (e.g., 151-152), through the semiconductor layer 103 (and particularly the channel region 113 thereof), and through the dielectric liner 117 into the cavity 116. The port(s) 122 can be configured to allow fluid to flow into the cavity 116 during a sensing operation.

For purposes of illustration, FIGS. 1.1B, 1.2B, 1.3B and 1.4B show a pair of capped openings 121. However, it should be understood that the semiconductor structure 100.1-100.4 can have any number of one or more openings 121. Those skilled in the art will recognize that the number, size, shape, and placement of the opening(s) 121 must be sufficient to ensure that, during processing, the cavity 116, as described above can be etched within the intermediate layer 102. Additionally, for purposes of illustration, FIGS. 1.1B, 1.2B, 1.3B and 1.4B also show a pair of ports 122. However, it should be understood that the semiconductor structure 100.1-100.4 can have any number of one or more ports 122. Those skilled in the art will recognize that the number, size, shape, and placement of the port(s) 122 must be sufficient to ensure that, during a sensing process, a sufficient amount of fluid can flow into the cavity 116 and come in contact with the surface 118 of that portion of the dielectric liner 117 at the top of the cavity 116 immediately adjacent to the channel region 113.

Figure 2B:
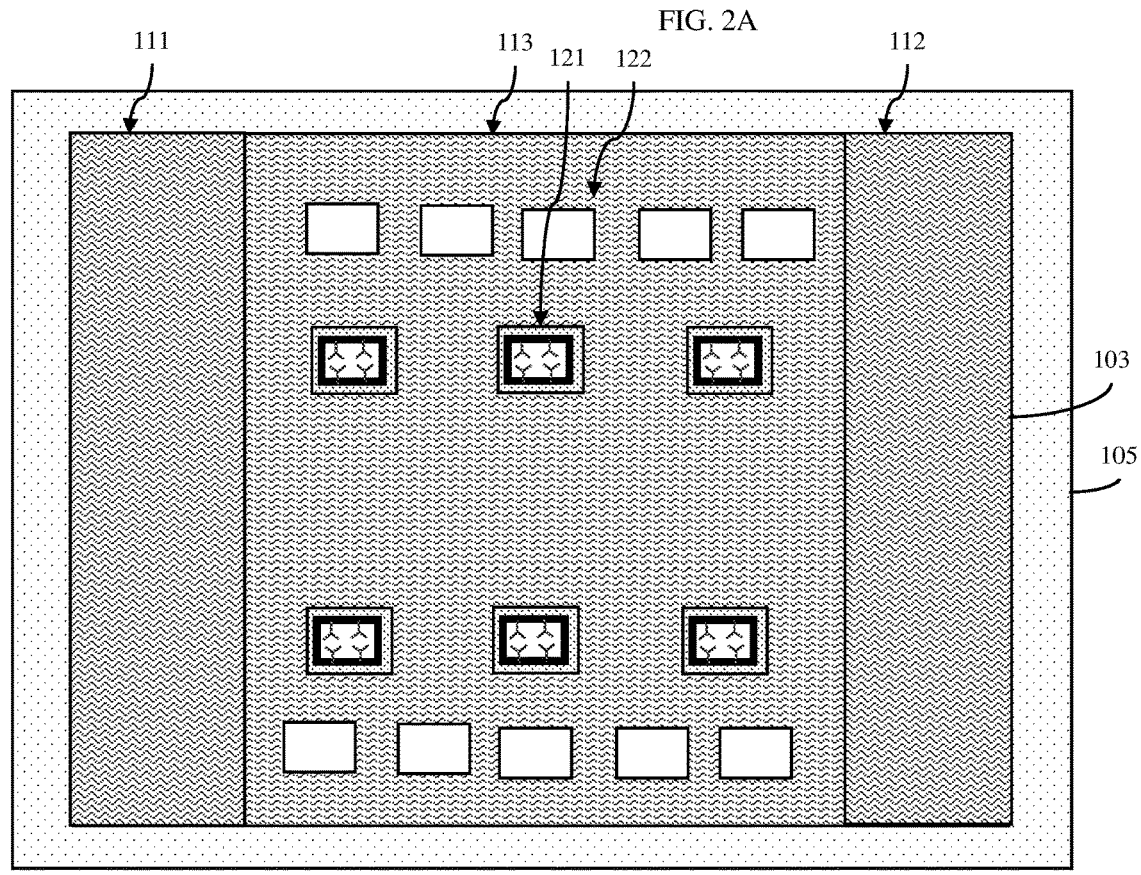
Figure 2C:
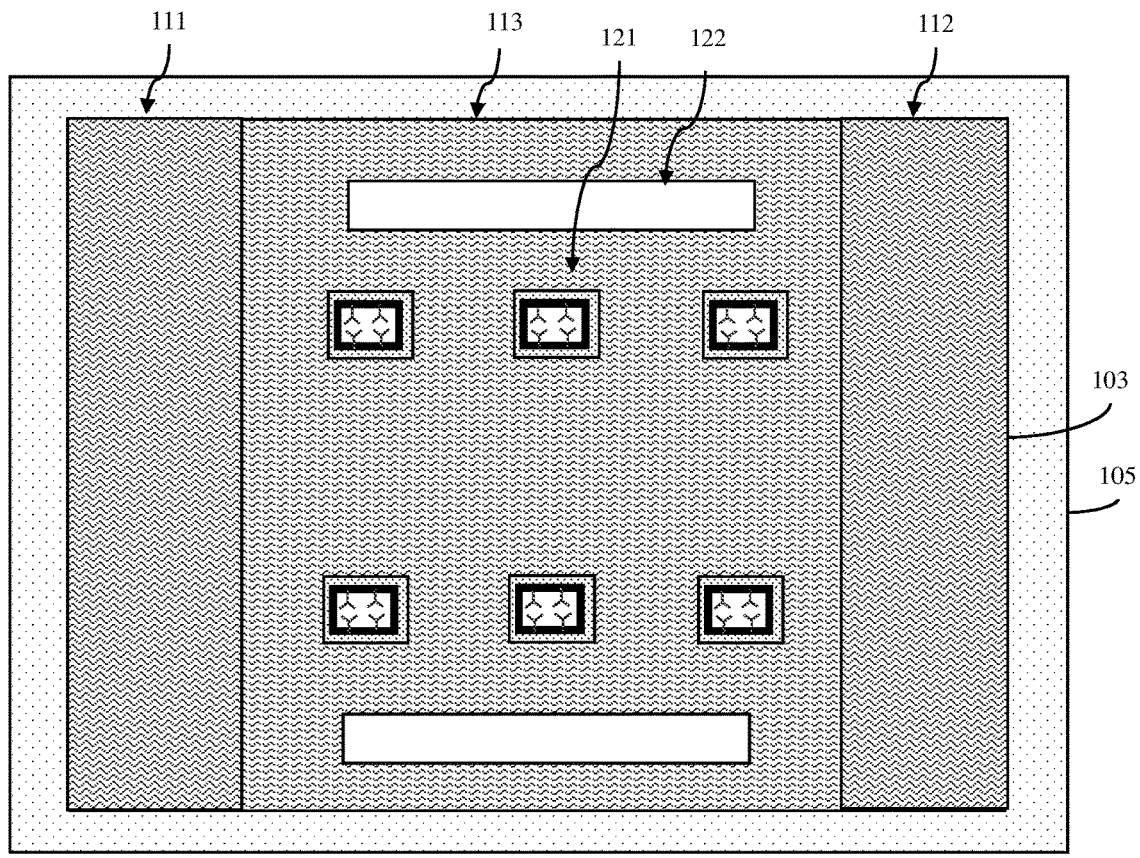
Figure 2D:
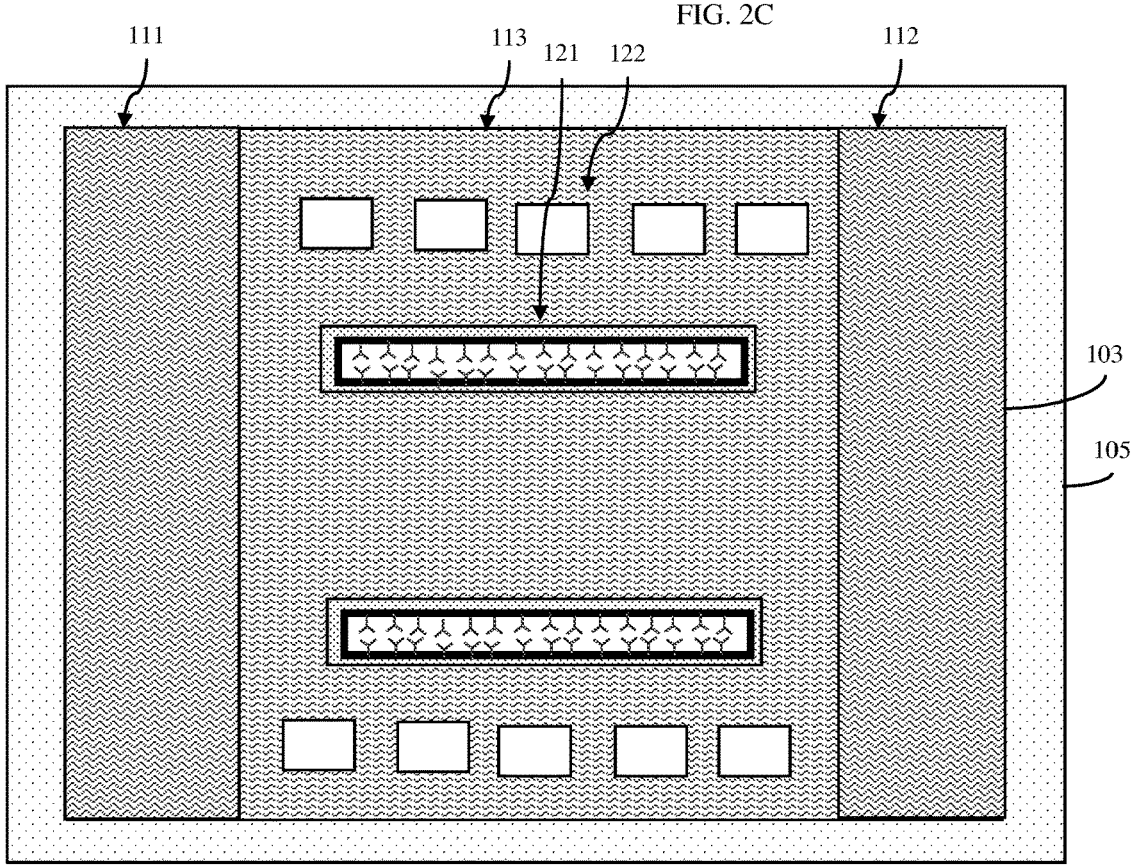

FIGS. 2A-2D are exemplary horizontal cross-section diagrams of the semiconductor structure 100.1-100.4 at the interface between the semiconductor layer 103 and the intermediate layer 102 (and cavity 116 therein). These cross-section diagrams illustrate alternative configurations for the opening(s) 121 and port(s) 122. For example, as illustrated in FIG. 2A, the semiconductor structure 100.1-100.4 can include a pair of elongated rectangular-shaped ports 122 placed on opposing sides of the channel region 113 and a pair of elongated rectangular-shaped openings 121 parallel to the ports 122. Alternatively, as illustrated in FIG. 2B, the semiconductor structure 100.1-100.4 can include two lines of square-shaped ports 122 placed on opposing sides of the channel region 113 and two lines of square-shaped openings 121 parallel to the lines of ports 122. Alternatively, as illustrated in FIG. 2C, the semiconductor structure 100.1-100.4 can include a pair of elongated rectangular-shaped ports 122 placed on opposing sides of the channel region 113 and two lines of square-shaped openings 121 parallel to the ports 122. Alternatively, as illustrated in FIG. 2D, the semiconductor structure 100.1-100.4 can include two lines of square-shaped ports 122 placed on opposing sides of the channel region 113 and a pair of elongated rectangular-shaped openings 121 parallel to the lines of ports 122. The number, size, shape, and placement of the opening(s) 121 and port(s) 122 shown in FIGS. 2A-2D are provided for illustration purposes and not intended to be limiting. Alternatively, any other suitable configuration for the opening(s) 121 and/or port(s) 122 could be employed.

In addition to the features described above, the disclosed embodiments of the semiconductor structure can include one or more optional features, as described below and illustrated in FIGS. 1.2A-1.2B, 1.3A-1.3B, and 1.4A-1.4B.

For example, optionally, to provide improved isolation of the FET from the semiconductor substrate 101 and/or from other devices on the semiconductor substrate 101 (particularly, in embodiments where the intermediate layer 102 is an epitaxial semiconductor layer (e.g., a silicon germanium layer) as opposed to an insulator layer), the semiconductor structure can include additional isolation regions 106 (e.g., deep trench isolation (DTI) regions) and/or a buried dopant implant region 107, also referred to herein as a buried well region (e.g., see the semiconductor structure 100.2 of FIGS. 1.2A-1.2B). For example, DTI regions 106 can extend vertically from the STI regions 105 through the intermediate layer 102 and into the semiconductor substrate 101. As mentioned above, the STI regions 105 can laterally surround the active device region of the semiconductor layer 103. The DTI regions 106 can similarly laterally surround that portion of the intermediate layer 102 aligned below the active device region and including the cavity 116. The buried dopant implant region 107 can, for example, be doped so as to electrically isolate the intermediate layer 102 from the lower portion of the semiconductor substrate 101. For example, if the semiconductor substrate 101 is a P− substrate, then the buried dopant implant region can be an N+ dopant implant region.

Additionally, or alternatively, since the primary gate structure of the FET is a fluid-based gate 115 below the channel region 113, body biasing can be provided by one or more MOL contacts 153 that extend through the MOL dielectric layers 151-152 to the top surface of the semiconductor layer 103 at the channel region 113 (e.g., see semiconductor structure 100.2 of FIGS. 1.3A-1.3B).

Additionally, or alternatively, since the primary gate structure of the FET is a fluid-based gate 115 below the channel region 113, a secondary gate structure 160 can be on the top surface of the semiconductor layer 103 at the channel region 113 (e.g., see the semiconductor structure 100.2 of FIGS. 1.4A-1.4B). This secondary gate structure 160 can be, for example, a conventional gate first gate structure, a gate first metal gate structure or a replacement metal gate structure including a gate dielectric layer 161 on the top surface of the semiconductor layer 103 and a gate conductor layer 162 on the gate dielectric layer 161. Such a secondary gate structure 160 be contacted, as illustrated, and employed to selectively adjust the VT of the FET. Alternatively, this secondary gate structure 160 could be an uncontacted dummy gate structure formed, for example, during processing to assist in patterning of the source/drain regions 111-113.

FIGS. 1.2A-1.4B are provided for illustration purposes and not intended to be limiting. It should be understood that the semiconductor structure disclosed herein could include any different combination of the optional features discussed above. For example, although not illustrated, a semiconductor structure embodiment could include DTI regions 106 and a secondary gate structure 160; a dopant implant region 107 and body contacts; and so on.

In any case, in each of the above-described semiconductor structure embodiments, the FET 110.1-110.4 with the buried fluid-based gate 115 can be employed to perform a sensing operation. Specifically, during the sensing operation, a fluid can be allowed to flow into the cavity 116 through the port(s) 122 and specific bias conditions can be applied to the FET terminals and the VT of the FET 110.1-110.4 will vary, depending upon variations in the surface potential at the surface 118 of the dielectric liner 117 (i.e., at the interface between the dielectric liner 117 and the fluid). This surface potential will vary depending upon the composition of the fluid. For example, in embodiments where the FET 110.1-110.4 is an ISFET (e.g., where the exposed surface 118 of the dielectric liner 117 is unadulterated), the surface potential can vary depending upon specific ions in the fluid and/or the pH of the fluid. In other embodiments where the exposed surface 118 of the dielectric liner 117 within the cavity is a functionalized surface (i.e., where the exposed surface 118 contains specific molecular receptors 119), the surface potential can vary when target analytes, if any, within the fluid bind to the specific molecular receptors 119 (e.g., when target bioanalytes, if any, within the fluid bind to specific bioreceptors at the functionalized surface). Variations in the VT caused by variations in the surface potential can, in turn, cause the Id of the FET to change. Thus, Id can be measured during the sensing operation and used, for example, to sense ions in or the pH of the fluid or, if applicable, to characterize and/or identify the target analyte (e.g., the target bioanalyte) in the fluid.

Figure 3:
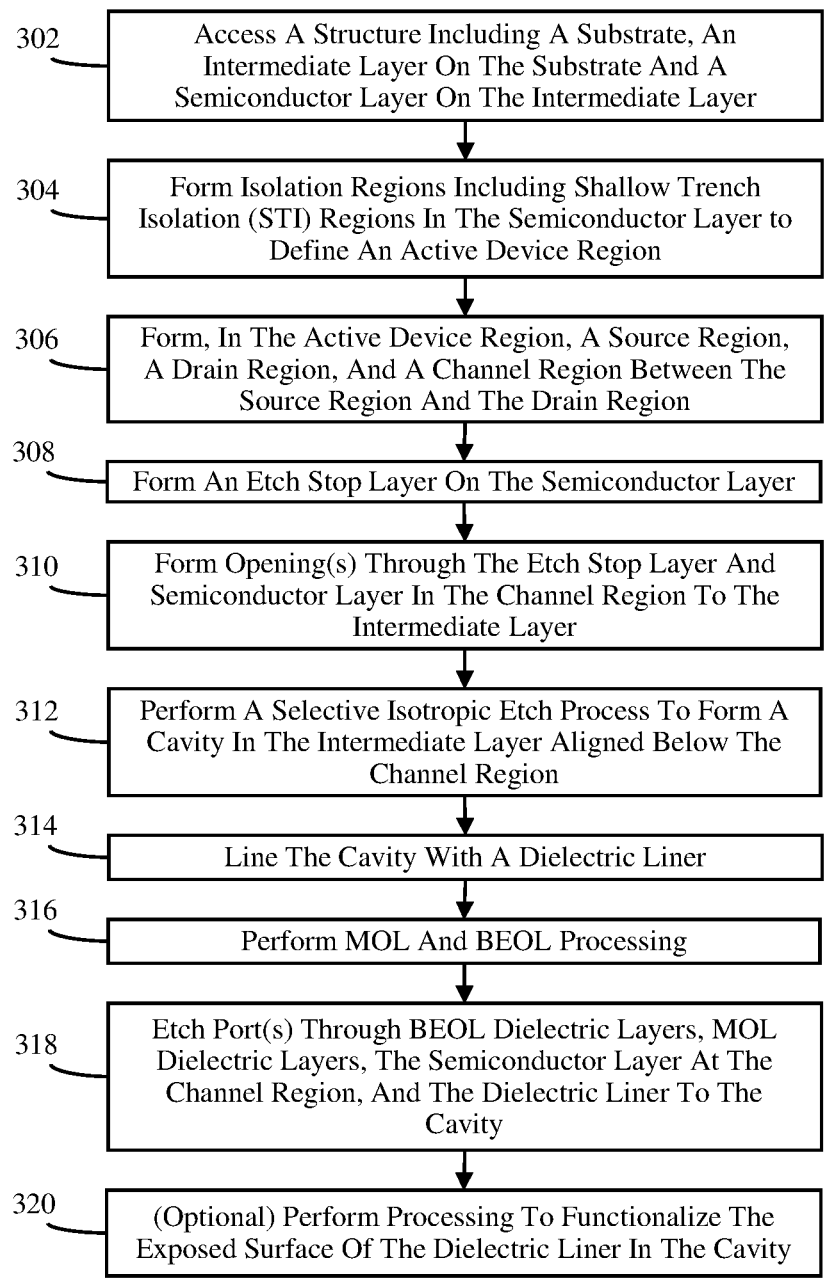
FIG. 3 is a flow diagram illustrating method embodiments for forming the disclosed semiconductor structures.

Referring to the flow diagram of FIG. 3, disclosed herein are embodiments of a method of forming a semiconductor structure including a device (e.g., a FET or, more particularly, a bioFET, an ISFET, or the like) with a buried fluid-based gate (e.g., see the semiconductor structures 100.1, 100.2, 100.3 and 100.4, each having FETs 110.1, 110.2, 110.3 and 110.4 with a buried fluid-based gate 115, as described above and illustrated in FIGS. 1.1A-1.1B, 1.2A-1.2B, 1.3A-1.3B, and 1.4A-1.4B.

Figure 4A:
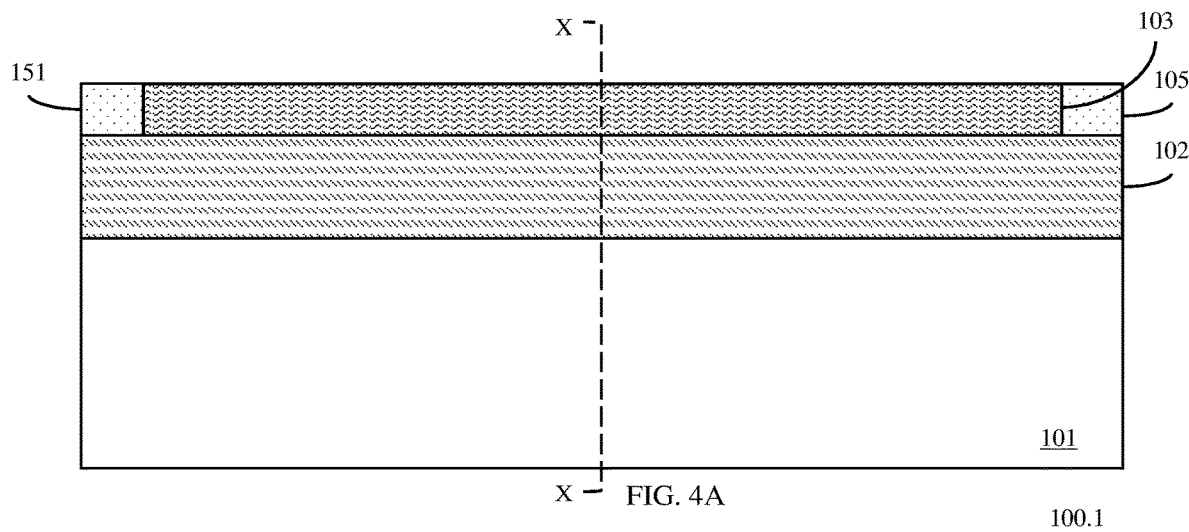
FIGS. 4A and 4B are different cross-section diagrams illustrating a partially completed semiconductor structure formed according to the flow diagram of FIG. 3.
Figure 4B:
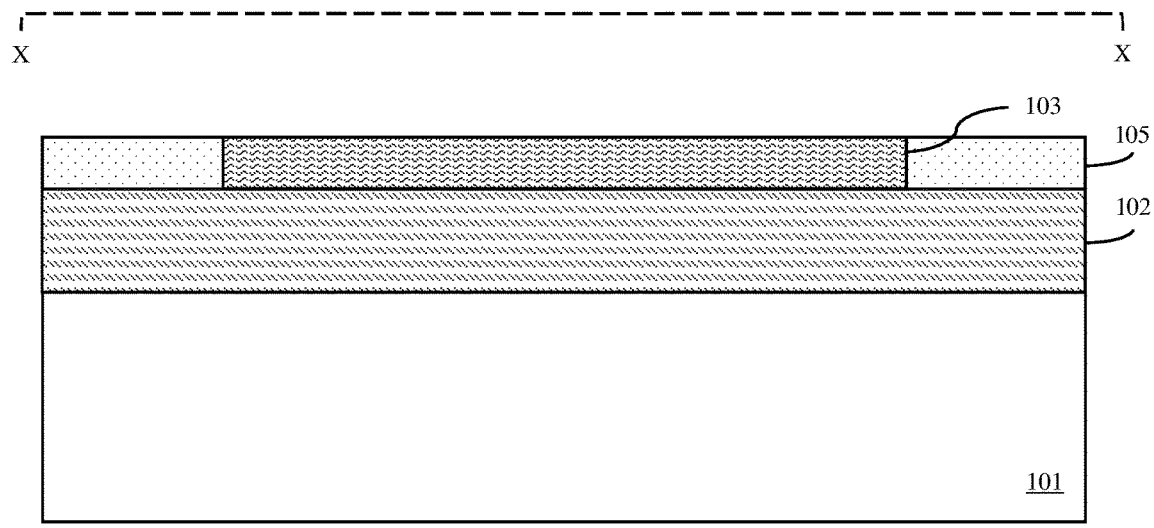

The method can include accessing a partially completed structure that includes a substrate 101, an intermediate layer 102 on the substrate 101, and a semiconductor layer 103 on the intermediate layer 102 (see process 302 and FIGS. 4A-4B). In some embodiments, the partially completed structure at process 302 can be a semiconductor-on-insulator structure (e.g., an SOI structure). For example, the substrate 101 can be a monocrystalline semiconductor substrate 101 (e.g., a silicon substrate) or a substrate of some other suitable semiconductor substrate material. The intermediate layer 102 can be an insulator layer and the insulator layer can be made of silicon dioxide or some other suitable insulator material. The semiconductor layer 103 can be made of silicon or some other suitable monocrystalline semiconductor material. In other embodiments, the partially completed structure at process 302 can be a bulk semiconductor structure. That is, the substrate 101 can be a monocrystalline semiconductor substrate 101 (e.g., a silicon substrate) or a substrate of some other suitable monocrystalline semiconductor substrate material. The intermediate layer 102 and the semiconductor layer 103 can be a pair of monocrystalline epitaxial semiconductor layers. The intermediate layer can specifically be made of a monocrystalline semiconductor material that is different from the monocrystalline semiconductor materials of the semiconductor substrate and the semiconductor layer. For example, if the semiconductor substrate 101 and the semiconductor layer 103 are made of silicon, then the intermediate layer 102 can be made of a silicon germanium or some other suitable monocrystalline semiconductor material that is different from silicon.

The method can include forming isolation regions 105 and, particularly, STI regions (see process 304 and FIGS. 4A-4B). The STI regions can be formed using conventional STI processing techniques such that they extend essentially vertically through the semiconductor layer 103 to the intermediate layer 102 below and further such that they laterally surround and, thereby, define an active device region for FET being formed. Optionally, at process 304 additional isolation regions can be formed including, but not limited to, deep trench isolation (DTI) region and/or a buried dopant implant region (e.g., as in FIGS. 1.2A-1.2B).

Figure 5A:
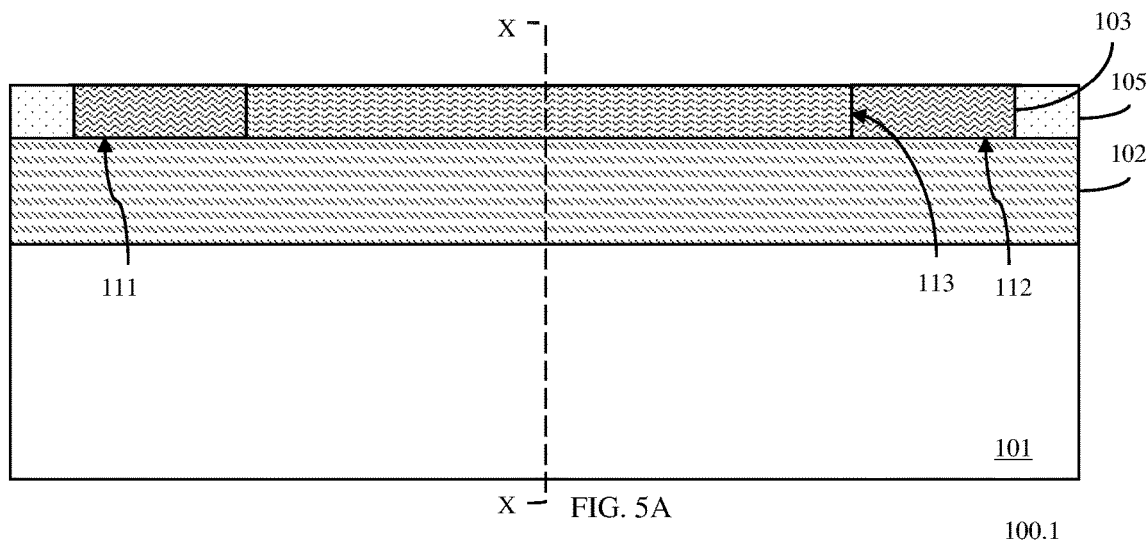
FIGS. 5A and 5B are different cross-section diagrams illustrating a partially completed semiconductor structure formed according to the flow diagram of FIG. 3.
Figure 5B:
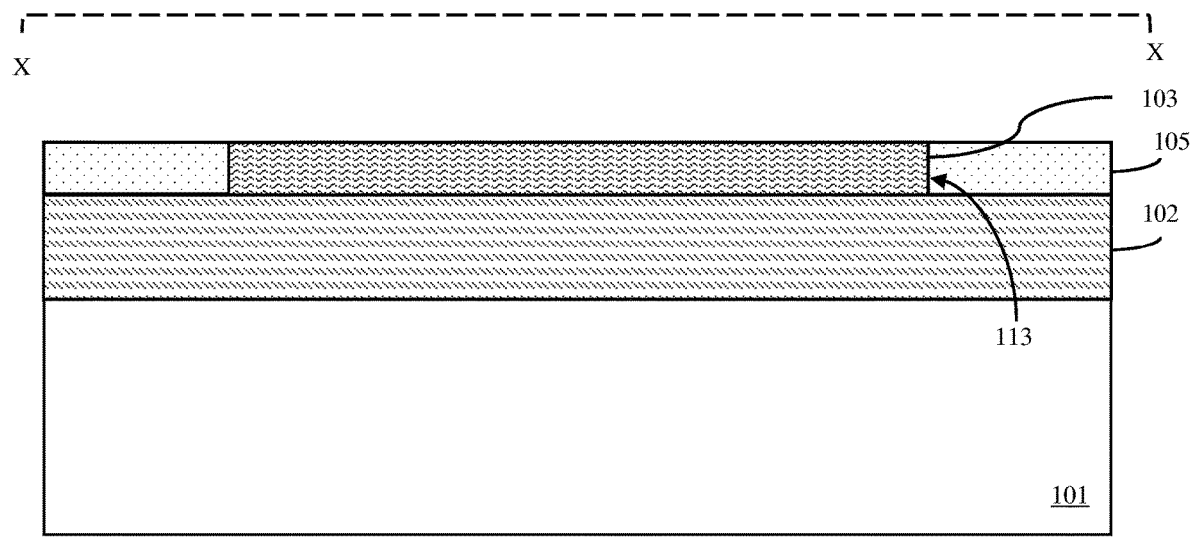

The method can further include forming, in the active device region, a source region 111, a drain region 112, and a channel region 113 positioned laterally between the source region 111 and the drain region 112 (see process 306 and FIGS. 5A-5B). In the below description of the method, reference is made to doping regions of the semiconductor layer so as to have a first-type conductivity or a second-type conductivity that is different from the first-type conductivity. It should be understood that the first-type conductivity and the second-type conductivity are either P-type conductivity and N-type conductivity, respectively, or N-type conductivity and P-type conductivity, respectively, depending upon whether the FET is an N-type FET (NFET) or a P-type FET (PFET). Specifically, if the FET being formed is an NFET, then the first-type conductivity refers to P-type conductivity and the second-type conductivity refers to N-type conductivity. However, if the FET being formed is a PFET, then the first-type conductivity refers to N-type conductivity and the second-type conductivity refers to P-type conductivity. See the detailed discussion below regarding different dopants that can be employed in semiconductor materials to achieve P-type conductivity or N-type conductivity. At process 306, the semiconductor layer can have the first-type conductivity at a relative low conductivity (or alternatively can be undoped) and a dopant implantation process can be performed to dope the source region 111 and the drain region 112 with the second-type conductivity at a relatively high conductivity level, while a mask protects the channel region 113. Alternatively, prior to process 306, a secondary gate structure (e.g., either a functional gate structure or a dummy gate structure) can be formed on the top surface of the semiconductor layer over the channel region using conventional gate processing techniques. In this case, at process 306, the semiconductor layer can have the first-type conductivity at a relative low conductivity (or alternatively can be undoped) and a dopant implantation process can be performed to dope the source region 111 and the drain region 112 with the second-type conductivity at a relatively high conductivity level, while the secondary gate structure protects the channel region 113.

Figure 6A:
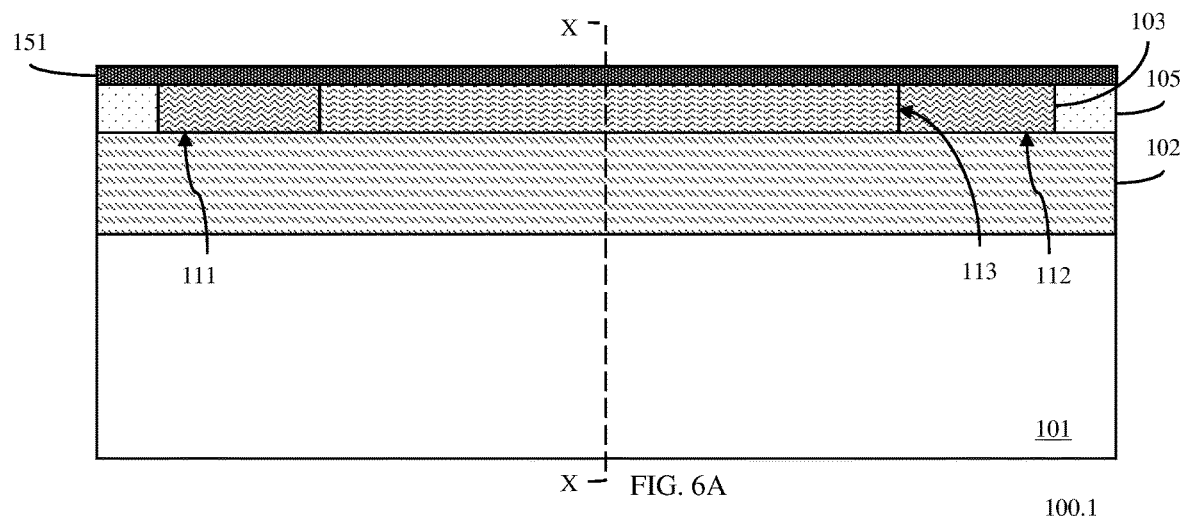
FIGS. 6A and 6B are different cross-section diagrams illustrating a partially completed semiconductor structure formed according to the flow diagram of FIG. 3.
Figure 6B:
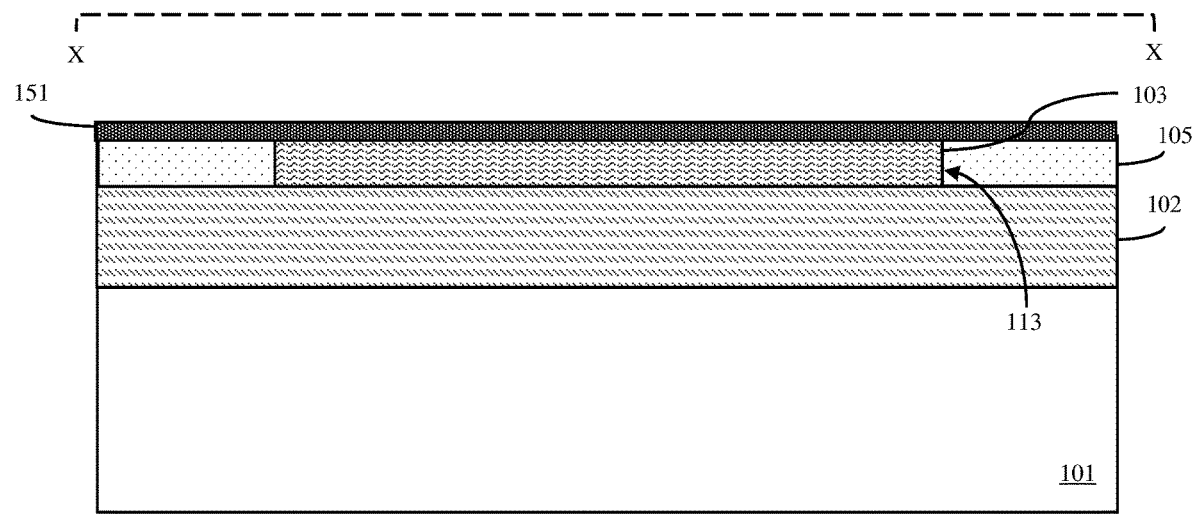

The method can further include forming, over the partially completed structure, a relatively thin conformal additional dielectric layer such as a thin etch stop layer 151 (see process 308 and FIGS. 6A-6B). This etch stop layer 151 can be, for example, a relatively thin silicon nitride layer or a relative thin layer of some other dielectric material suitable for use as an etch stop layer.

Figure 7:
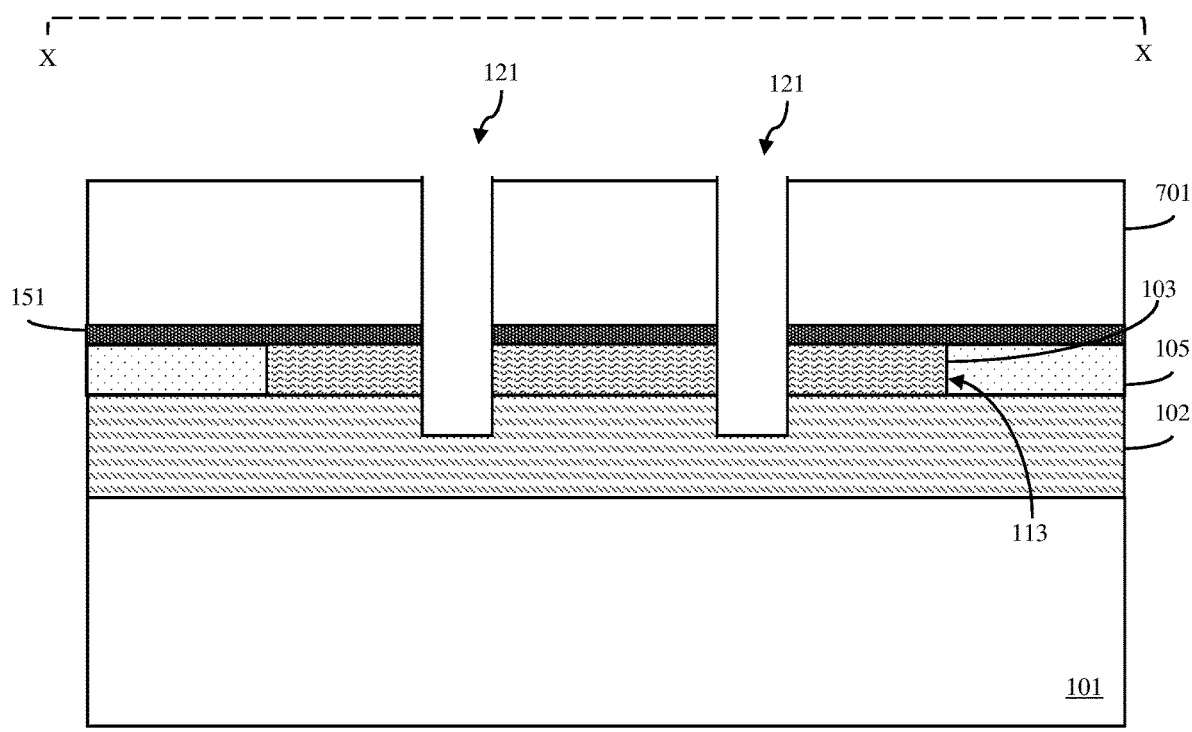
FIG. 7 is a cross-section diagram illustrating a partially completed semiconductor structure formed according to the flow diagram of FIG. 3.

The method can further include forming a mask layer 701 on the etch stop layer 151. This mask layer 701 can be lithographically patterned and etched using an anisotropic etch process so that one or more opening(s) 121 extend essentially vertically therethrough to the etch stop layer 151 and is/are aligned above the channel region 113. The method can further include continuing the anisotropic etch process to extend the opening(s) 121 through the etch stop layer 151, through the semiconductor layer 103 and to or into the intermediate layer 102 (see process 310 and FIG. 7).

Figure 8A:
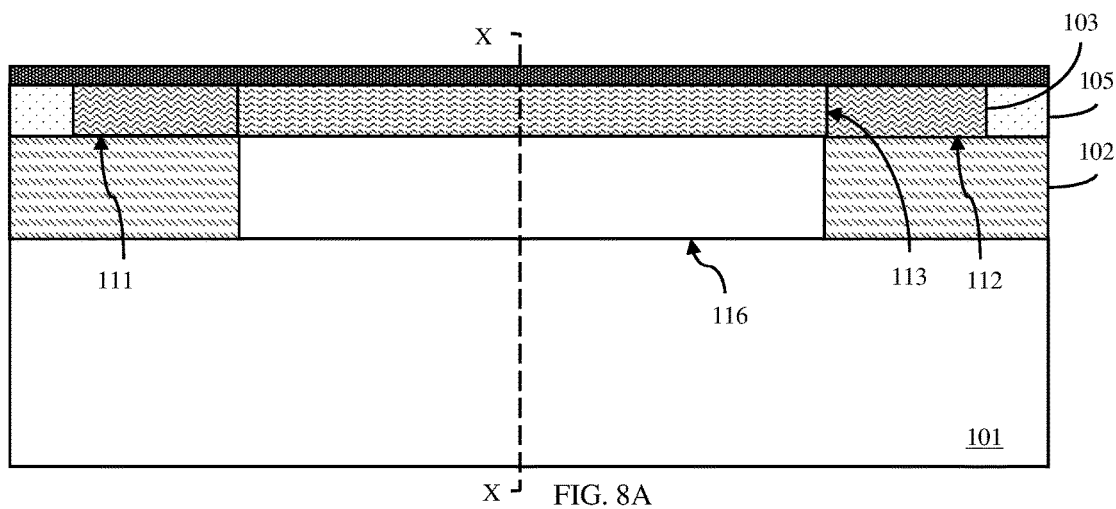
FIGS. 8A and 8B are different cross-section diagrams illustrating a partially completed semiconductor structure formed according to the flow diagram of FIG. 3.
Figure 8B:
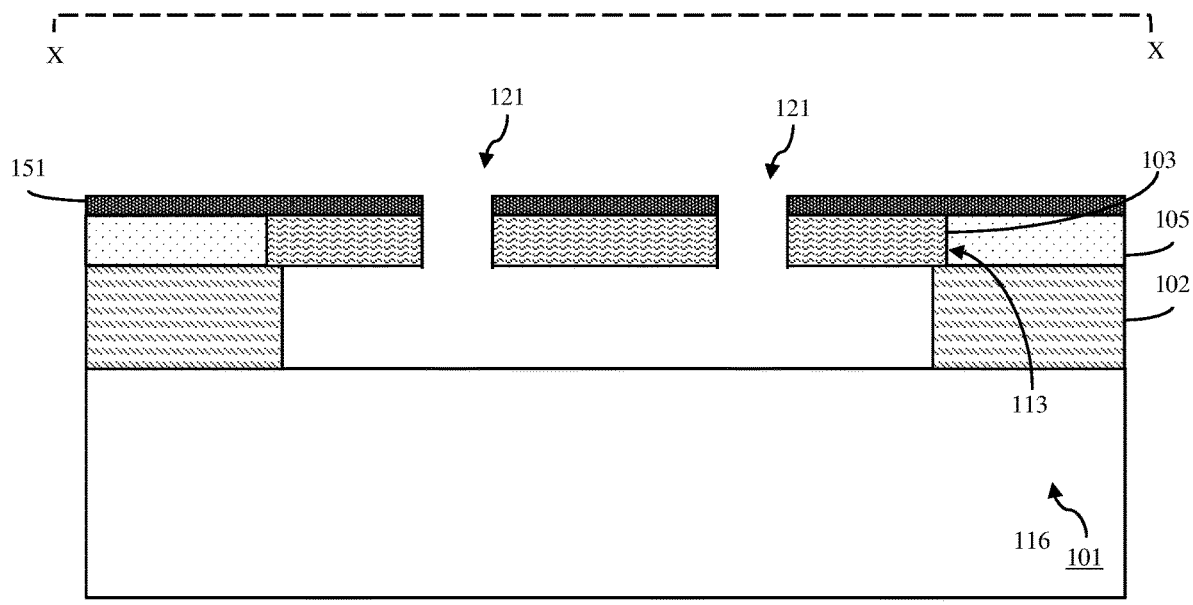

Formation of the opening(s) 121 can be followed by removal of the mask layer 701 and a selective isotropic etch process that etches away portions of the intermediate layer 102 aligned below the channel region 113 and exposed to the etchant so as to create a cavity 116 (see process 312 and FIGS. 8A-8B). It should be understood that the number, size, shape, and placement of the opening(s) 121 must be sufficient to ensure that the cavity 116 will have the desired size, shape, etc. (see also the detailed discussion of FIGS. 2A-2D above). It should also be understood that the etch specifications used at process 312 will vary depending upon the material of the intermediate layer 102 (e.g., depending upon whether it is a silicon dioxide layer or a silicon germanium layer). Techniques for performing such selective isotropic etch processes are known in the art. For example, a hydrofluoric acid (HF) wet etch process could be employed for isotropic etching of a silicon dioxide intermediate layer selective to other exposed materials (e.g., nitride, silicon etc.), whereas a chlorine (Cl) or carbon tetrafluoride (CF4) based reactive ion etch (RIE) process could be employed for isotropic etching of a silicon germanium intermediate layer selective to the other exposed materials. These exemplary selective isotropic etch processes are provided for illustration purposes and it should be understood that, alternatively, any other suitable selective isotropic etch processes could be employed to create the cavity 116 at process 312. In any case, the cavity 116 should be etched during processing such that it extends laterally in a first direction across the width of the channel region 113 (e.g., to just below the interfaces between the channel region 113 and the STI regions 105), such that it further extends laterally in a second direction perpendicular to the first direction across the length of the channel region 113 (e.g., to just below the interfaces between the channel region 113 and the source/drain regions 111-112), and such that it extends vertically from immediately adjacent to the first surface of the semiconductor layer 103 downward toward, to (as illustrated), or into the top surface of the semiconductor substrate 101.

Figure 9A:
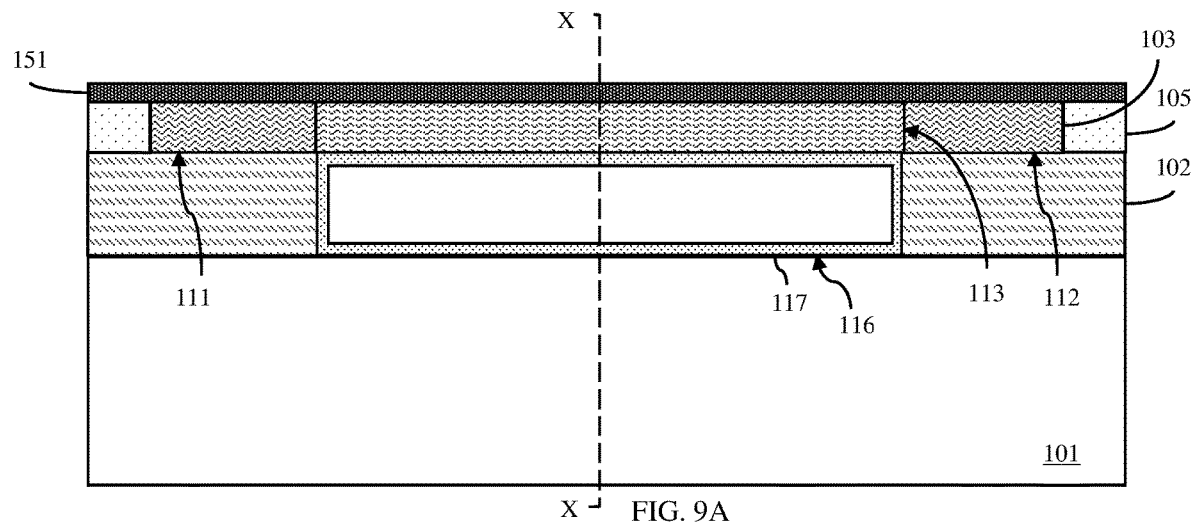
FIGS. 9A and 9B are different cross-section diagrams illustrating a partially completed semiconductor structure formed according to the flow diagram of FIG. 3.
Figure 9B:
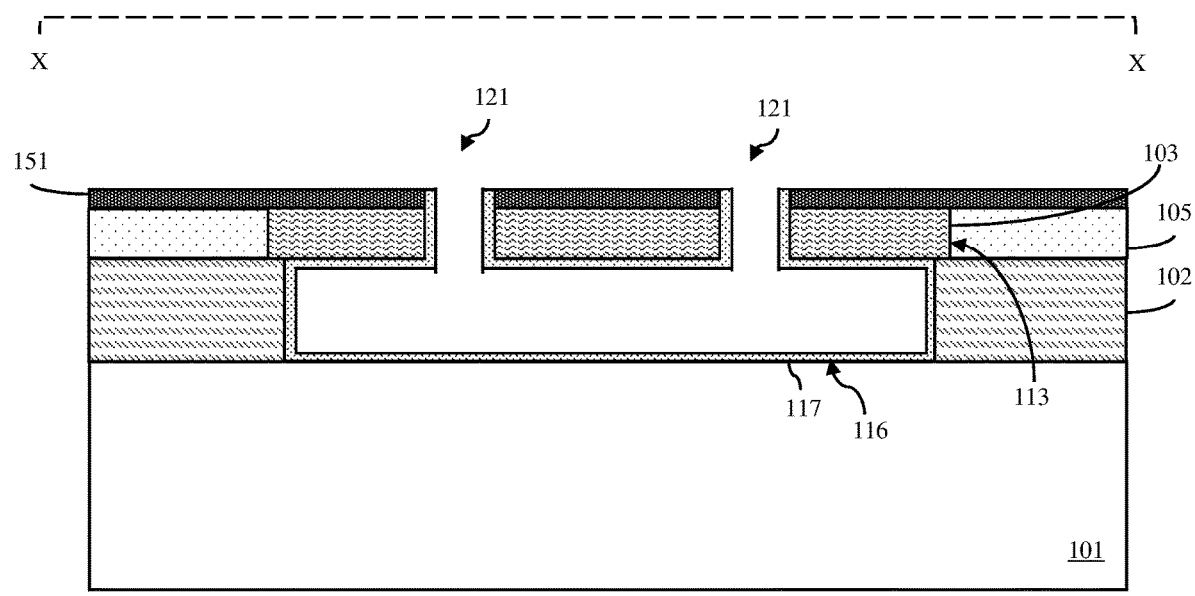

The method can further include forming a thin dielectric liner 117 that lines the cavity 116 and the sidewalls of the opening(s) 121 (see process 314 and FIGS. 9A-9B). The dielectric liner 117 can be made of any suitable gate dielectric material (e.g., silicon dioxide, a high-K dielectric material, or some other suitable dielectric material). Exemplary high-K dielectric materials include, but are not limited to, hafnium (Hf)-based dielectric materials (e.g., hafnium oxide, hafnium silicon oxide, hafnium silicon oxynitride, hafnium aluminum oxide, etc.), aluminum oxide, tantalum oxide, zirconium oxide, etc. The dielectric liner 117 can be formed at process 314 using, for example, an ALD process or some other suitable thin film deposition process in which the material can be conformally deposited through the opening(s) 121 so as to line the cavity 116. Optionally, any dielectric liner material above the etch stop layer 151 can be removed (e.g., using a chemical mechanical polishing (CMP) process). Alternatively, the dielectric liner material could be left on the top surface of the etch stop layer 151 during subsequent processing (not shown).

Figure 10A:
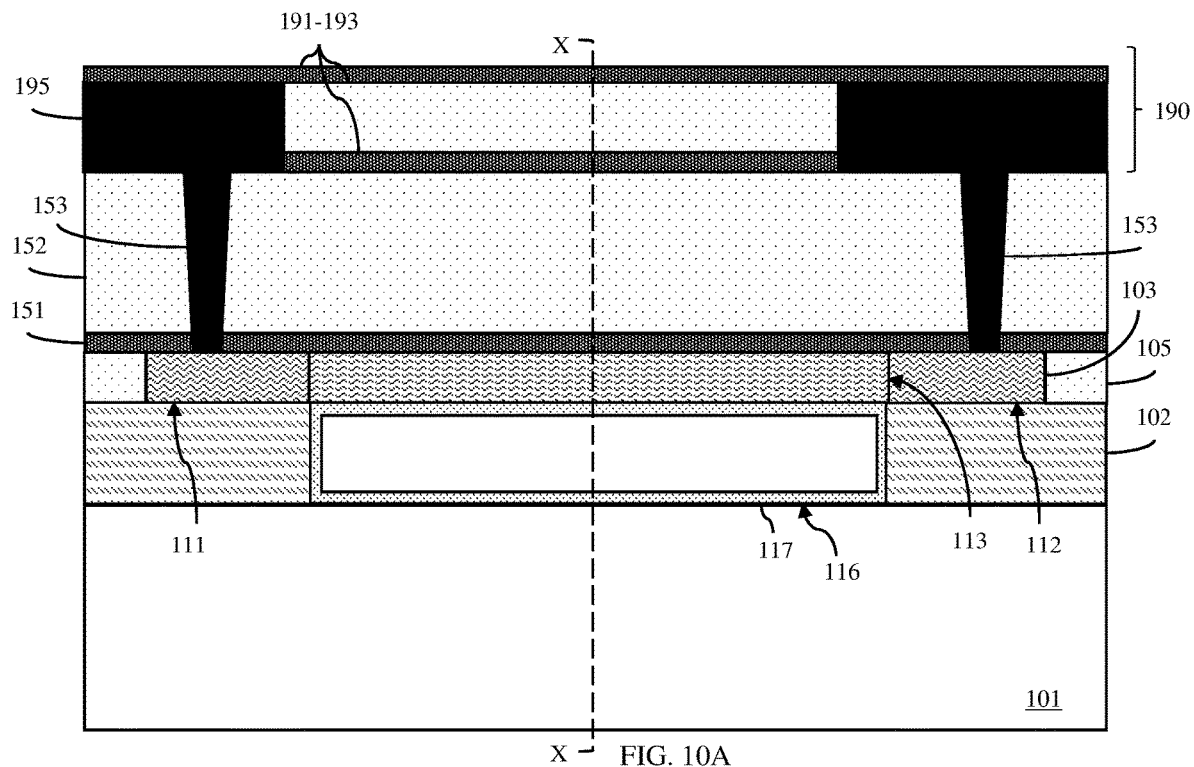
FIGS. 10A and 10B are different cross-section diagrams illustrating a partially completed semiconductor structure formed according to the flow diagram of FIG. 3.
Figure 10B:
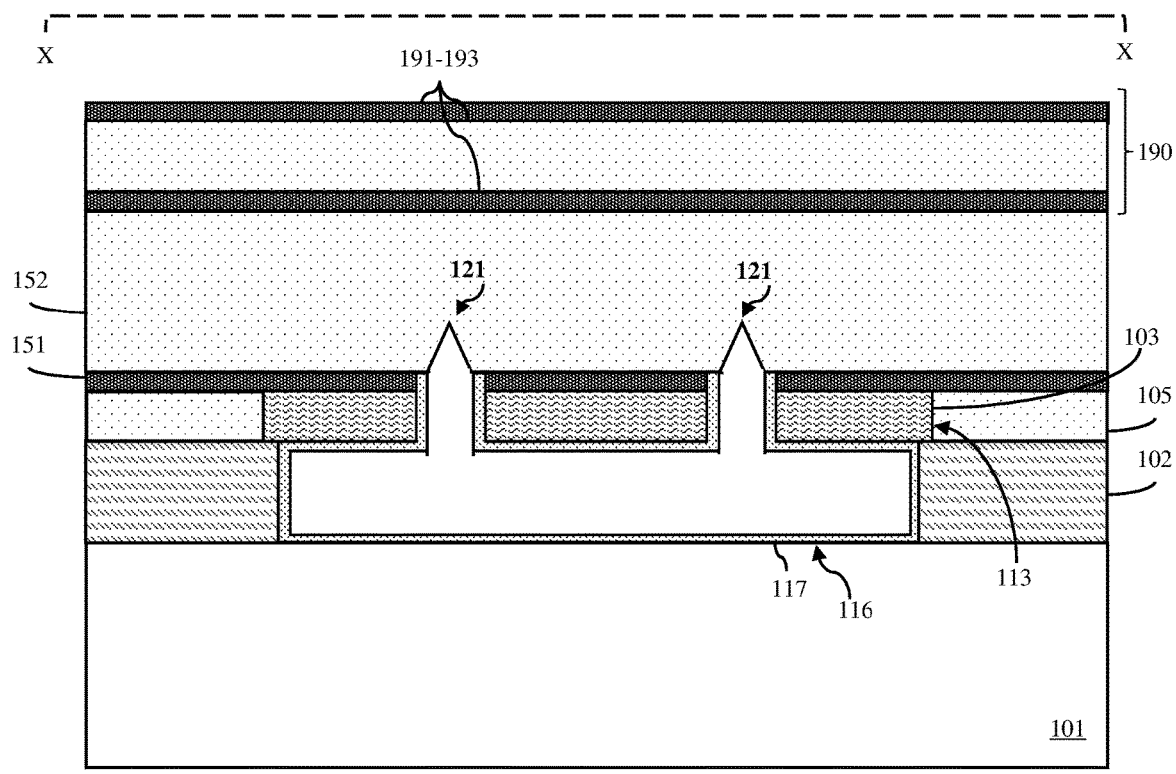

The method can further include performing conventional MOL and FEOL processing (see process 316 and FIGS. 10A-10B). For example, at least one blanket ILD material layer 152 can be formed on the etch stop layer. The ILD material layer 152 can be, for example, silicon dioxide, doped silicon glass (e.g., phosphosilicate glass (PSG) or borophosphosilicate glass (BPSG)), or any other suitable ILD material. This ILD material layer 152 can cap the opening(s) 121. It should be noted that, depending upon the method used to deposit the ILD material layer 152 at process 316, the bottom surface(s) of the portion(s) of the ILD material layer 152 that cap the opening(s) 121 may have concave surface(s) (e.g., with V or deep-V shape(s) extending into the ILD material layer 152). Furthermore, although not shown, some of the ILD material may be deposited into the opening(s) 121 onto the surface of the dielectric liner 117 at the bottom of the cavity 116. One or more MOL contacts 153 can be formed such that they extend essentially vertically through the layers 152-151 to one or more of the terminals (e.g., to at least the source region 111 and the drain region 112 and, optionally, to the channel region 113 as in FIGS. 1.3A-1.3B or to a secondary gate structure 160 on the channel region 113 as in FIGS. 1.4A-1.4B). For the BEOL, an additional etch stop layer 191 (e.g., a thin silicon nitride layer) can be formed above and immediately adjacent to the top surface of the ILD material layer 152 and contacts 153 therein and an additional ILD material layer 192 on the additional etch stop layer 191. One or more metal wires 195 can be formed within the layers 191-192 and yet another additional etch stop layer 193 can be formed over the metal wires 195.

Figure 11:
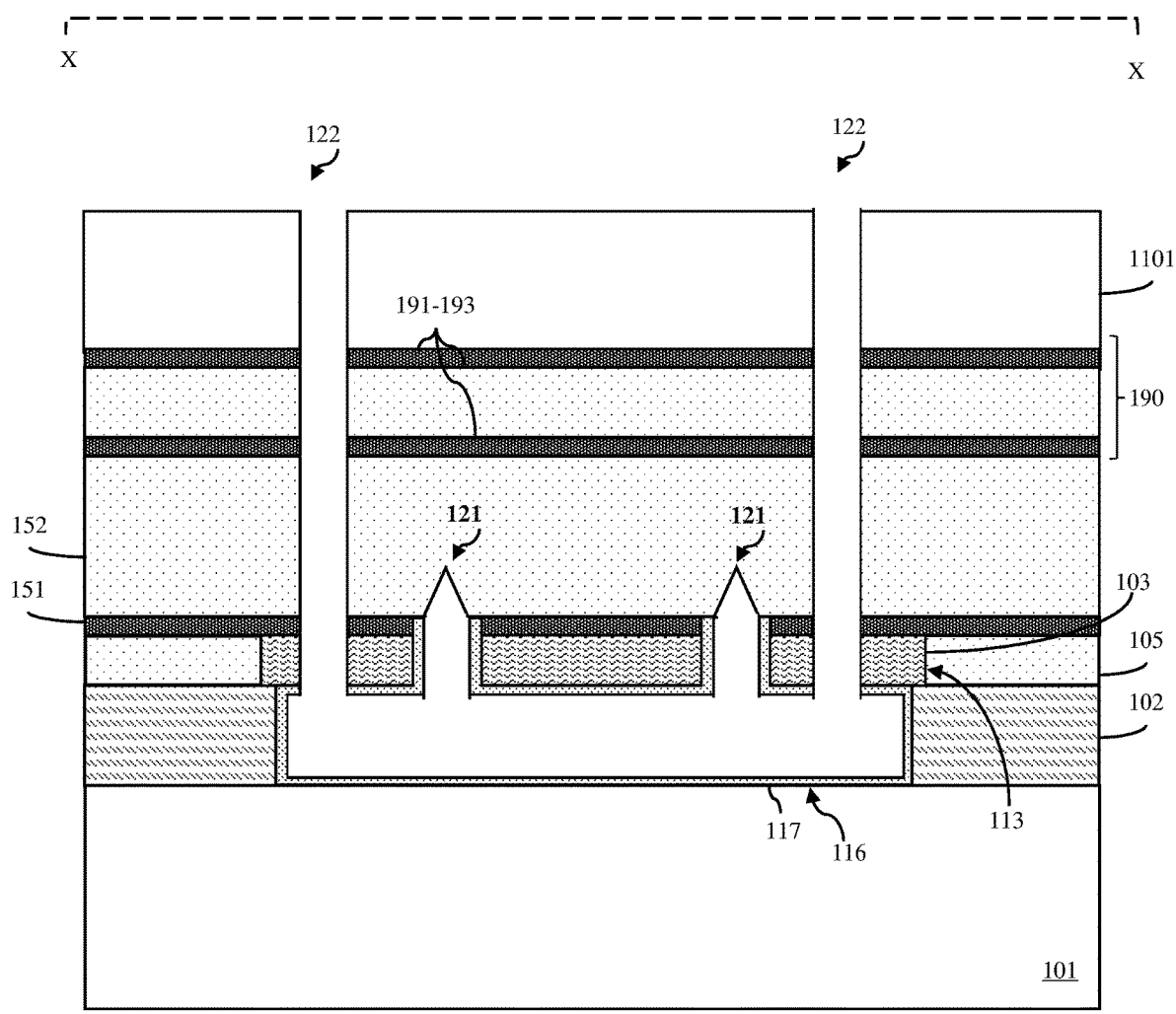
FIG. 11 is a cross-section diagram illustrating a partially completed semiconductor structure formed according to the flow diagram of FIG. 3.

Following BEOL and MOL process, an additional mask layer 1101 on the etch stop layer 193. This additional mask layer 1101 can be lithographically patterned and etched using an anisotropic etch process so that one or more port(s) 122 extend essentially vertically therethrough to the etch stop layer 193 and is/are aligned above the channel region 113. The method can further include continuing the anisotropic etch process to extend the port(s) 122 through the BEOL dielectric layers (e.g., 193, 192 and 191), through the MOL dielectric layers (e.g., 152 and 151), through the semiconductor layer 103 (and, particularly, the channel region 113 thereof) and further through the dielectric liner 117 to the cavity 116 (see process 318 and FIG. 11). It should be understood that the number, size, shape, and placement of the port(s) 122 must be sufficient to allow for a sensing process, as described above.

It should be noted that in if the FET being formed is an ISFET that will be, for example, employed for sensing ions in and/or pH of a fluid, the surface 118 of the dielectric liner 117 exposed within the cavity 116 can remain essentially unadulterated. However, optionally and as illustrated in the drawings for purposes of illustration, the method can further include functionalizing the surface 118 of the dielectric liner 117 exposed within the cavity 116 (see process 320 and FIGS. 1.1A-1.1B, 1.2A-1.2B, 1.3A-1.3B, and 1.4A-1.4B). Those skilled in the art will recognize that surface functionalization is a process through which specific molecular receptors 119 (e.g., specific bioreceptors) are tethered to the surface 118 of the dielectric liner 117. Various techniques for achieving surface functionalization are well known in the art. For example, surface functionalization can be achieved by reacting the surface 118 of the dielectric liner 117 with organosilanes and then attaching receptors by amine coupling. Alternatively, any other suitable technique could be used to achieve surface functionalization.

It should be understood that in the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

Additionally, the method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should further be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

Finally, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate;
   an intermediate layer on the substrate;
   a semiconductor layer on the intermediate layer; and
   a dielectric liner lining a cavity in the intermediate layer and further lining at least one opening that extends through the semiconductor layer to the cavity, wherein the dielectric liner is immediately adjacent to the semiconductor layer within the cavity and wherein at least one port extends through the semiconductor layer and the dielectric liner to the cavity.

2. The structure of claim 1, wherein, within the at least one opening and the cavity, the dielectric liner has an exposed surface comprising receptors.

3. The structure of claim 1, wherein the dielectric liner comprises any of silicon dioxide and a high-K dielectric material.

4. The structure of claim 1, wherein the intermediate layer comprises any of an insulator layer and an additional semiconductor layer comprising a different semiconductor material than the semiconductor layer and the substrate.

5. The structure of claim 1, further comprising:
   an additional dielectric layer on the semiconductor layer; and
   an interlayer dielectric material layer on the additional dielectric layer, wherein the at least one port extends through the interlayer dielectric material layer, the additional dielectric layer, the semiconductor layer and the dielectric liner to the cavity.

6. The structure of claim 5, wherein the at least one opening extends through the additional dielectric layer and the semiconductor layer to the cavity, and wherein the interlayer dielectric material layer caps the at least one opening.

7. The structure of claim 1, further comprising a buried well region in the substrate adjacent to the cavity.

8. The structure of claim 1, further comprising isolation regions in the semiconductor layer positioned laterally adjacent to an active device region, wherein the active device region comprises a channel region positioned laterally between a source region and a drain region and wherein the cavity is aligned below the channel region.

9. The structure of claim 8, further comprising additional isolation regions extending from the isolation regions through the intermediate layer and into the substrate.

10. The structure of claim 8, wherein the semiconductor layer has a first surface adjacent to the intermediate layer and a second surface opposite the first surface and wherein the structure further comprises a gate structure adjacent to the channel region on the second surface of the semiconductor layer.

11. The structure of claim 8, wherein the semiconductor layer has a first surface adjacent to the intermediate layer and a second surface opposite the first surface and wherein the structure further comprises at least one contact adjacent to the channel region on the second surface of the semiconductor layer.

12. A structure comprising:
    a substrate;
    an intermediate layer on the substrate;
    a semiconductor layer on the intermediate layer; and
    a device comprising:

a source region, a drain region, and a channel region, wherein the channel region is within the semiconductor layer and positioned laterally between the source region and the drain region; and a dielectric liner lining a cavity in the intermediate layer and further lining at least one opening that extends through the semiconductor layer to the cavity, wherein the cavity is aligned below the channel region, wherein, within the at least one opening and the cavity, the dielectric liner is immediately adjacent to the semiconductor layer and has an exposed surface comprising bioreceptors, and wherein at least one port extends through the semiconductor layer and the dielectric liner to the cavity.

13. A method comprising:

forming a cavity in an intermediate layer between a substrate and a semiconductor layer on the intermediate layer, wherein at least one opening extends through the semiconductor layer to the cavity;

lining the at least one opening and the cavity with a dielectric liner such that the dielectric liner is immediately adjacent to the semiconductor layer within the cavity; and forming at least one port that extends through the semiconductor layer and the dielectric liner to the cavity.

14. The method of claim 13, further comprising processing an exposed surface of the dielectric liner such that the exposed surface comprises receptors.

15. The method of claim 13, wherein the intermediate layer comprises any of an insulator layer and an additional semiconductor layer comprising a different semiconductor material than the semiconductor layer and the substrate.

16. The method of claim 13, wherein the lining of the at least one opening and the cavity comprises: performing atomic layer deposition of the dielectric liner, and wherein the dielectric liner comprises any of silicon dioxide and a high-K dielectric material.

17. The method of claim 13, wherein the forming of the cavity comprises:

forming the at least one opening extending through an additional dielectric layer in the semiconductor layer and further extending through the semiconductor layer to the intermediate layer; and etching the intermediate layer to form the cavity.

18. The method of claim 17, further comprising forming an interlayer dielectric material layer on the additional dielectric layer, wherein the interlayer dielectric material layer caps the at least one opening and wherein the at least one port is formed so as to extend through the interlayer dielectric material layer, the additional dielectric layer, the semiconductor layer and the dielectric liner to the cavity.

19. The method of claim 13, further comprising:

forming isolation regions in the semiconductor layer positioned laterally adjacent to an active device region; and forming, in the active device region, a channel region positioned laterally between a source region and a drain region, wherein the cavity is formed so as to be aligned below the channel region.

20. The method of claim 19, wherein the semiconductor layer has a first surface adjacent to the intermediate layer and a second surface opposite the first surface and wherein the method further comprises any of:

forming additional isolation regions extending from the isolation regions through the intermediate layer and into the substrate;

forming a buried well region in the substrate;

forming a gate structure adjacent to the channel region on the second surface of the semiconductor layer; and forming at least one contact adjacent to the channel region on the second surface of the semiconductor layer.

* * * * *